US012745783B2

(12) United States Patent
Hugenroth et al.

(10) Patent No.: US 12,745,783 B2
(45) Date of Patent: Sep. 29, 2026

(54) FROZEN CONFECTION MACHINES AND APPARATUS FOR MIXING WITH HEAT TRANSFER

(71) Applicant: CREMMJOY INC., Baton Rouge, LA (US)

(72) Inventors: Jason James Hugenroth, Baton Rouge, LA (US); Max Louis Lemoine, Baton Rouge, LA (US); Daniel Ross Stelly, Baton Rouge, LA (US)

(73) Assignee: Cremmjoy Inc., Baton Rouge, LA (US)

( * ) Notice: Subject to any disclaimer, the term of this patent is extended or adjusted under 35 U.S.C. 154(b) by 566 days.

(21) Appl. No.: 18/089,362

(22) Filed: Dec. 27, 2022

(65) Prior Publication Data

US 2023/0133185 A1 May 4, 2023

Related U.S. Application Data

(63) Continuation-in-part of application No. PCT/US2021/039105, filed on Jun. 25, 2021.

(60) Provisional application No. 63/129,812, filed on Dec. 23, 2020, provisional application No. 63/043,935, filed on Jun. 25, 2020.

(51) Int. Cl.

| | |
|---|---|
| ***A23G 9/22*** | (2006.01) |
| ***A23G 9/20*** | (2006.01) |
| ***A23G 9/28*** | (2006.01) |
| ***A23G 9/30*** | (2006.01) |

(52) U.S. Cl.

CPC ............... *A23G 9/224* (2013.01); *A23G 9/20* (2013.01); *A23G 9/281* (2013.01); *A23G 9/30* (2013.01)

(58) Field of Classification Search

CPC ......... F25B 47/006; A23G 9/224; A23G 9/20; A23G 9/30; A23G 9/281; B01F 35/513; B01F 35/92; B01F 31/312

See application file for complete search history.

(56) References Cited

U.S. PATENT DOCUMENTS

| | | | | |
|---|---|---|---|---|
| 3,323,587 | A * | 6/1967 | Lowell | F28D 9/04 165/166 |
| 3,332,670 | A | 7/1967 | Swartz | |
| 3,828,571 | A | 8/1974 | Lechner | |
| 3,828,572 | A | 8/1974 | Calim | |

(Continued)

FOREIGN PATENT DOCUMENTS

| | | | |
|---|---|---|---|
| CN | 105876066 | A | 8/2016 |
| CN | 106163295 | A | 11/2016 |

(Continued)

OTHER PUBLICATIONS

International Search Report and Written Opinion for International application No. PCT/US2021/039105, mailed Sep. 29, 2021.

(Continued)

*Primary Examiner* — Tavia Sullens

(74) *Attorney, Agent, or Firm* — Carlson, Gaskey & Olds, P.C.

(57) ABSTRACT

A frozen fluid mixing and dispensing apparatus is disclosed. The apparatus includes a flexible-walled package enclosing a cavity that receives a liquid that is mixed with air and chilled in the apparatus to form an associated frozen slurry therethrough.

7 Claims, 28 Drawing Sheets

(56) References Cited

U.S. PATENT DOCUMENTS

| | | | |
|---|---|---|---|
| 4,022,031 | A | 5/1977 | Calim |
| 4,049,242 | A | 9/1977 | Porter |
| 4,550,653 | A | 11/1985 | Hedenberg |
| 4,717,047 | A | 1/1988 | Van Overbruggen et al. |
| 5,405,054 | A | 4/1995 | Thomas |
| 5,520,010 | A | 5/1996 | Altman |
| 5,875,930 | A | 3/1999 | Nakajima et al. |
| 6,016,935 | A | 1/2000 | Huegerich et al. |
| 6,142,340 | A | 11/2000 | Watanabe et al. |
| 6,419,121 | B1 | 7/2002 | Gutierrez et al. |
| 6,439,759 | B1 | 8/2002 | Ray et al. |
| 6,691,894 | B2 | 2/2004 | Chrisman et al. |
| 6,814,262 | B1 | 11/2004 | Adams et al. |
| 6,868,987 | B2 | 3/2005 | Hedington et al. |
| 8,181,568 | B1 | 5/2012 | Hofman et al. |
| 8,602,259 | B2 | 12/2013 | Py et al. |
| 8,678,236 | B2 | 3/2014 | Burke et al. |
| 8,944,289 | B2 | 2/2015 | Cocchi et al. |
| 9,505,600 | B2 | 11/2016 | Vulpitta et al. |
| 9,591,865 | B2 | 3/2017 | Ravji et al. |
| 10,017,371 | B2 | 7/2018 | Vulpitta et al. |
| 10,207,234 | B2 | 2/2019 | Ray et al. |
| 2003/0085237 | A1 | 5/2003 | Kateman et al. |
| 2004/0250554 | A1 | 12/2004 | Kateman et al. |
| 2004/0251270 | A1 | 12/2004 | Davis et al. |
| 2006/0134275 | A1 | 6/2006 | Maeda et al. |
| 2007/0154605 | A1 | 7/2007 | Kobayashi et al. |
| 2008/0105711 | A1 | 5/2008 | Kirimli et al. |
| 2008/0149664 | A1 | 6/2008 | Schroeder et al. |
| 2008/0290117 | A1 | 11/2008 | Schroeder et al. |
| 2011/0068120 | A1 | 3/2011 | McGill |
| 2012/0096875 | A1 | 4/2012 | Ravji et al. |
| 2015/0253067 | A1 | 9/2015 | Bucceri |
| 2015/0289708 | A1 | 10/2015 | Ezaz-Nikpay et al. |
| 2016/0174593 | A1 | 6/2016 | Cocchi et al. |
| 2016/0273849 | A1* | 9/2016 | Ohkubo ................ F25B 47/006 |
| 2017/0015541 | A1 | 1/2017 | Vulpitta et al. |
| 2017/0172173 | A1 | 6/2017 | Navarro et al. |
| 2018/0110238 | A1 | 4/2018 | Mohammed et al. |
| 2018/0289034 | A1 | 10/2018 | Vulpitta et al. |
| 2019/0142028 | A1 | 5/2019 | Arao et al. |
| 2019/0234685 | A1 | 8/2019 | Heninger |
| 2019/0337787 | A1 | 11/2019 | Sakai et al. |
| 2019/0345430 | A1 | 11/2019 | Sethi et al. |
| 2019/0380358 | A1 | 12/2019 | Cocchi et al. |

FOREIGN PATENT DOCUMENTS

| | | | |
|---|---|---|---|
| CN | 107427673 | A | 12/2017 |
| CN | 109152387 | A | 1/2019 |
| EP | 2266417 | A1 | 12/2010 |
| EP | 3068724 | B1 | 1/2019 |
| FR | 2172749 | A1 | 10/1973 |
| GB | 2348637 | A | 10/2000 |
| IT | 201700101073 | A1 | 3/2019 |
| JP | 2001095495 | A | 4/2001 |
| JP | 2005-176621 | A | 7/2005 |
| JP | 2012-42193 | A | 3/2012 |
| WO | WO 1998/054979 | | 12/1998 |
| WO | 03/070071 | A1 | 8/2003 |
| WO | WO 2007/108136 | A1 | 9/2007 |
| WO | 2010149509 | A1 | 12/2010 |
| WO | 2014067987 | A1 | 5/2014 |
| WO | 2014182423 | A2 | 11/2014 |
| WO | 2015073511 | A2 | 5/2015 |
| WO | 2015121736 | A2 | 8/2015 |
| WO | 2016090438 | A1 | 6/2016 |
| WO | 2017200022 | A1 | 11/2017 |
| WO | WO 2018/141758 | A1 | 8/2018 |
| WO | 2018215743 | A1 | 11/2018 |
| WO | WO 2020/163369 | A1 | 8/2020 |

OTHER PUBLICATIONS

European Search Report for EP Application No. 21827914.9 dated Jun. 24, 2024.

European Search Report for EP Application No. 20751966.1 dated Sep. 27, 2022.

International Search Report and Written Opinion for PCT Application No. PCT/US2020/016628 dated Jun. 10, 2020.

International Preliminary Report on Patentability for PCT Application No. PCT/US2021/039105 dated Dec. 13, 2022.

International Preliminary Report on Patentability for PCT Application No. PCT/US2020/016628 dated Aug. 10, 2021.

European Search Report for EP Application No. 25198832.5 dated Nov. 28, 2025.

* cited by examiner

FROZEN CONFECTION MACHINES AND APPARATUS FOR MIXING WITH HEAT TRANSFER

This application is a continuation-in-part of and claims the priority benefit of PCT/US2021/039105, filed Jun. 25, 2021, and also claims the priority benefit of U.S. provisional application Ser. No. 63/043,935, filed Jun. 25, 2020, and provisional application Ser. No. 63/129,812, filed Dec. 23, 2020, the entire disclosures of each of which are incorporated herein by reference.

The entire disclosure of commonly owned, application U.S. Ser. No. 17/428,091, national entry date of Aug. 3, 2021, now U.S. Pat. No. 12,336,550, based on PCT/US2020/016628, filed Feb. 4, 2020, is incorporated herein by reference. Additional applications for the invention in PCT/US2020/16628 are disclosed herein.

BACKGROUND

Summary

There is provided an improved frozen fluid mixing and dispensing apparatus.

A preferred embodiment of the apparatus includes a flexible-walled package enclosing a cavity that receives an associated liquid. The package includes an inlet communicating with the cavity and the inlet is configured to receive the associated liquid, and an outlet communicating with the cavity and in spaced relation to the inlet. The outlet is configured to dispense an associated frozen slurry therethrough. An assembly mixes air with the associated liquid and preferably includes one of (i) a rolled plate heat exchanger (RPHE) including at least one cold plate operatively engaging an external surface of the flexible package for heat transfer with the associated liquid in the package cavity or (ii) a homogenizer to reduce a size of air bubbles mixed with the associated liquid received in the cavity. A dispensing nozzle at the outlet is configured to dispense a frozen slurry therefrom.

A thermally insulated, sealed container is dimensioned to receive the flexible-walled package and RPHE therein that limits frosting that can occur.

The apparatus may include a frost collector to collect moisture in the sealed container and cool the collected moisture to a temperature less than the cold plate and thereby prevent condensation of frosting of the cold plate.

The frost collector may include at least one of (i) a hydrophilic coating to hold the collected moisture; (ii) a water absorbing material for absorbing the moisture; (iii) dessicant, or (iv) a dehumidifier to remove moisture from air introduced into the container.

A dispensing nozzle may be provided at the outlet, and a sanitizing assembly for sterilizing at least the dispensing nozzle. The sanitizing assembly may include an electromagnetic radiation disinfecting unit (UV light source). The sanitizing assembly may be configured to sterilize the flexible-walled package.

The sanitizing assembly may include a germicidal system using at least one of gas, vapor, liquid, or heat to sanitize the nozzle. In preferred embodiments, the sanitizing assembly includes one of a hydrogen peroxide vapor generator and an ozone generator to sanitize the nozzle. Alternatively, the sanitizing assembly includes a disinfecting unit that provides a liquid wash to clean the nozzle. The disinfecting unit may be configured to direct liquid wash into a dispensing tube that connects the nozzle to the cavity of the flexible-walled package, and a drain passage for removing the liquid wash.

The RPHE may include at least one support member configured to receive the flexible-walled package. The first support member may be constructed of a material having a high thermal conductivity for operative engagement with the cold plate of the RPHE and a second support member constructed from a material having a tensile strength to withstand tensile loads induced by a roller of the RPHE.

A flexible backing member may be disposed between the flexible-walled package and the roller of the RPHE to provide structural support for the package and prevent rupture thereof, and in a preferred arrangement the flexible backing member includes a component for heating or cooling the backing member.

The homogenizer preferably includes a pressurized air source for introducing air bubbles into the associated liquid and a mixer.

In an another embodiment, at least first and second distinct freeze bags are alternately filled with associated liquid and an associated frozen liquid dispensed therefrom.

The apparatus may further include a point of sale system to accept payment for dispensing the viscous frozen slurry from the nozzle.

A reservoir bag may be in fluid communication with the flexible-walled package, and a check valve operatively associated with an external surface of tubing connecting the reservoir bag and the flexible-walled package.

A preferred check valve includes a base, movable foot, and an arm that connects the foot to the base so that the foot can move toward or away from the tube, and may also include a detector that senses a position of the check valve.

An air purifier may be included to sanitize air introduced into the air bag. A preferred air purifier includes at least one of (i) a filter or (ii) UV light source that irradiates a light transmissive tube/passage that leads to the cavity of the flexible-walled package or (iii) heating element configured to raise a temperature of the associated fluid sufficient for sanitizing.

In a preferred arrangement, the cold plate is a metallic sheet or thick metallic foil. The cold plate may include an extension that includes a heating element for selectively heating the inlet to the cavity to prevent the associated fluid in the inlet from freezing.

The RPHE may include fluid channels in the cold plate to enhance heat transfer. Preferably, the fluid channels direct cooling fluid toward a roller side of the flexible-walled package.

The container dimensioned to receive the flexible-walled package may include a cleaning system having at least one of (i) spray nozzles that direct an associated cleaning solution, (ii) heating elements, (iii) UV light, and (iv) disinfectants into the cavity.

A temperature monitoring system including sensing elements may be included in the assembly to detect the temperature of the flexible-walled package. The sensing elements may include mechanochromic materials used to sense pressure in the flexible-walled package. Further, a thermal insulator that thermally isolates the sensing elements from the cold plate may be included in order to more accurately measure a temperature of the flexible-walled package.

Force sensors may be used to monitor a relative doneness of the associated liquid in the cavity and are operatively associated with rollers of the RPHE to stop roller action if the force exceeds a predetermined threshold. The force sensors may preferably include at least one of load cells, strain gauges, piezo electric sensors, and displacement transducers to directly or indirectly measure a force acting on guide rails that support the flexible-walled package.

Further, biasing members may be provided that urge a roller of the RPHE against the cold plate to ensure sufficient contact pressure between the roller and flexible walled package.

In an another embodiment, a roller of the RPHE is a continuous loop belt that reduces rolling resistance and stress on the flexible-walled package during kneading and freezing of the associated fluid in the cavity. The continuous loop belt may be made from a thermal conductor such as thin metal or metallic mesh.

The cold plate in one version has a curvature to enhance contact pressure of the flexible-walled package between a roller of the RPHE and cold plate.

In other embodiments, at least one movable roller operatively engages a surface portion of the flexible-walled package and the movable roller extends over only a portion of a width of the flexible-walled package.

Further, improvements to the invention of the same application are also disclosed herein. The present exemplary embodiment relates to apparatuses, systems, and methods for freezing and dispensing confections such as ice cream, smoothies, sorbets, gelatos, yogurts, daiquiris, margaritas, etc., and the like. It finds particular application in conjunction with low-cost disposable packages, typically flexible packages or bags, which contain a comestible mixture for producing such confections and will be described with particular reference thereto. However, it is to be appreciated that the present exemplary embodiment is also amenable to other like applications. For some applications the mixture in the bag would be something other than a comestible mixture. For example, the mixture could be a saline solution. The frozen confection machine can be used for making a saline slush. The saline solution can be stored and processed in the flexible packaged in a sterile state. In this way, sterile saline slush can be made. Sterile saline slush is used in cardiovascular, renal, urological, and other medical procedures to limit tissue damage during surgery.

The current invention has many advantages over existing methods of producing surgical slush. The current most common method of making surgical slush is to fill a refrigerated sterile basin with saline. The processes of setting up the machine is cumbersome and it takes about 45 minutes for the slush to freeze, while the saline is exposed to open air in the surgical room, which increases the possibility of the slush becoming contaminated.

DETAILED DESCRIPTION

Figure 1:
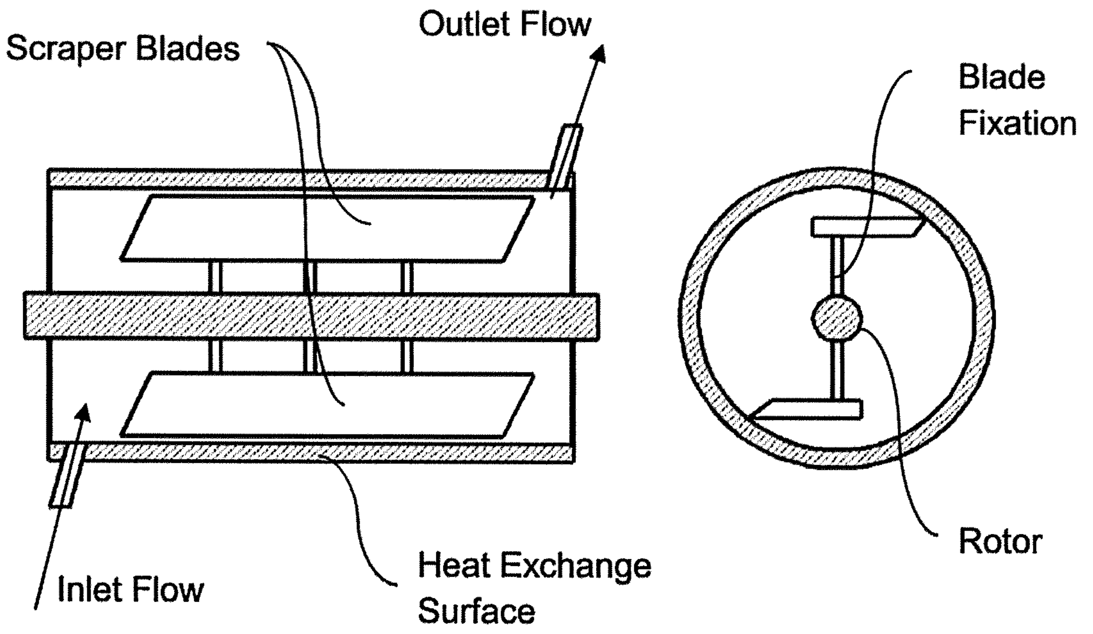
Fig. 1 (PRIOR ART)
FIG. 1 shows a scraped surface heat exchanger.
Figure 2:
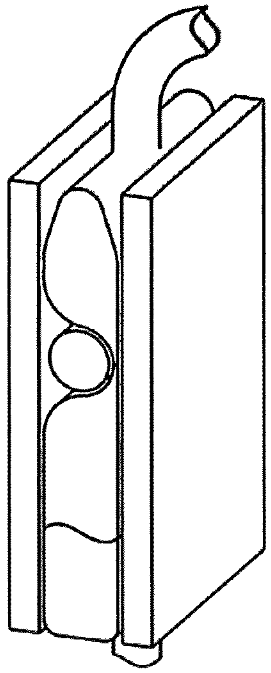
FIG. 2 is a perspective view of the rolled plate heat exchanger (RPHE).

A scraped surface heat exchanger (SSHE) used in conventional frozen confection machines is shown in FIG. 1. The current invention replaces the SSHE with the inventive rolled plate heat exchanger (RPHE) shown in FIG. 2. SSHE are used in many applications outside of a frozen confection machine. Applications exist in the food, pharmaceutical and chemical industries. SSHEs are used when some degree of mixing is required during the heat transfer process, when the process fluid is viscous, when crystallization is occurring or for other uses when conventional heat exchangers cannot be used effectively. The SSHE can be used for heating or cooling the process fluid or material, which may be a comestible mixture, but can also be non-comestible fluids, slurries or other materials that can be made to flow through the SSHE. The RPHE (FIG. 2) can also be used independently of the frozen confection machine for applications where SSHEs are currently used.

Several embodiments of the RPHE operation are detailed in PCT/US2020/016628. The RPHE has advantages over the SSHE in many applications. For example, in pharmaceutical applications it is necessary to maintain sterility of the product during the heat transfer process. The SSHE has many parts that need to be cleaned and sterilized periodically. This adds cost and risk to the process. When the RPHE is used for the same process, the product is contained in sterile flexible packaging, which can be removed and disposed of when the processing operation is complete.

Figure 3:
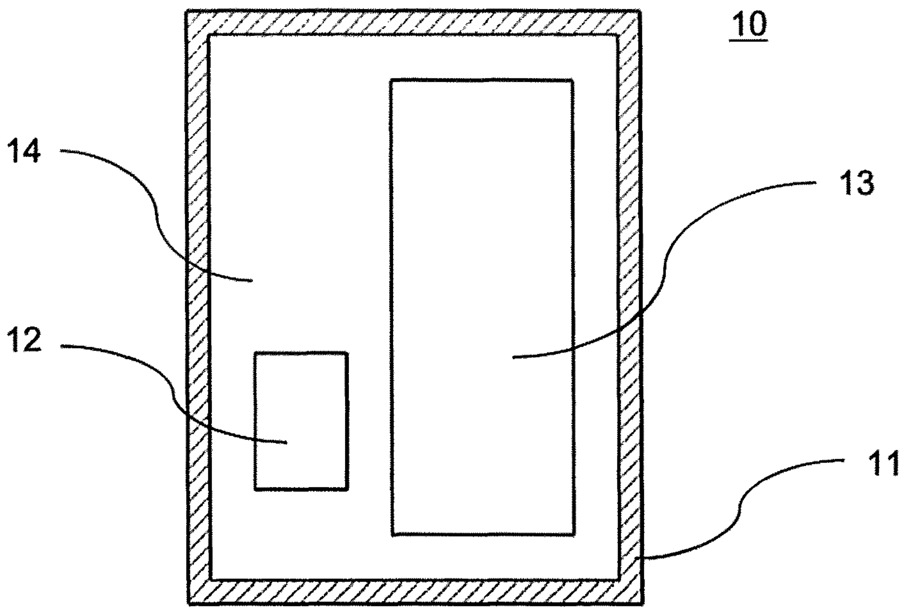
FIG. 3 shows an embodiment of a frost control method.

When the RPHE is used for cooling, such as with frozen confection machines, it is possible for the surfaces on the cold plate, freeze bag and other components to cool to or below the dew point of the surrounding air. This will result in condensate or frost forming on these surfaces. This is generally undesirable. One method of limiting the potential for frosting is to contain the RPHE in a sealed container, such as a thermally insulated cabinet 11. This will limit the amount of frosting that can occur. However, moisture laden air 14 will still remain in the cabinet. FIG. 3 shows an embodiment of a frost control method. Here a frost collector 12 is used to preferentially collect the moisture in the space containing the RPHE 13. The frost collector 12 can be operated at a temperature that is lower than the cold plate temperature. The cold plate is a component of the RPHE 13 that is not shown explicitly. This would cause the frost to adhere to the frost collector and lower the moisture content of the air. Since the frost collector temperature is lower than the cold plate temperature, the dew point of the air will dip below the temperature of the cold plate or RPHE 13 components, which will prevent condensation or frosting of the cold plate. The frost collector can also be cooled before the cold plate so that moisture is removed from the air before the cold plate is cooled. As previously stated, the frost collector may operate below the cold plate temperature, which has some desirable effects, however, it is not strictly necessary. The frost collector 12 could operate at or above the cold plate temperature. A worker of skill in the art would recognize that a frost collector which can be controlled to achieve these various temperatures would include an electronic component with a control to achieve a desired temperature. This is supported by the paragraph bridging columns 23 and 24 of the parent U.S. Pat. No. 12,336,550. For example, if the RPHE and frost collector were cooled at the same rate to the same temperature, frosting could occur on both components, but the amount of frosting that could occur on the cold plate would be reduced. The frost collector can incorporate a hydrophilic component as a coating, surface attachment or other means. The surface would tend to hold the water even if the temperature of the frost collector was raised. A water absorbing material like sodium polyacrylate could also be used for absorbing the water. A means for collecting the water and removing it from the cabinet can also be used. Another option would be to use a desiccant to absorb moisture from the air. This can occur while the machine is off or actively cooling. The desiccant can be removed for regeneration or can be regenerated in place. For example, an embedded heating element can be used to heat the desiccant so that it is regenerated for reuse. Typically, regeneration would be done when the RPHE cooling is in an off cycle. Another option would be to first dehumidify the air using a frost collector or other means before or as it is moved into the insulated cabinet 11, so that dry or low humidity air is all that remains in the cabinet.

Figure 4:
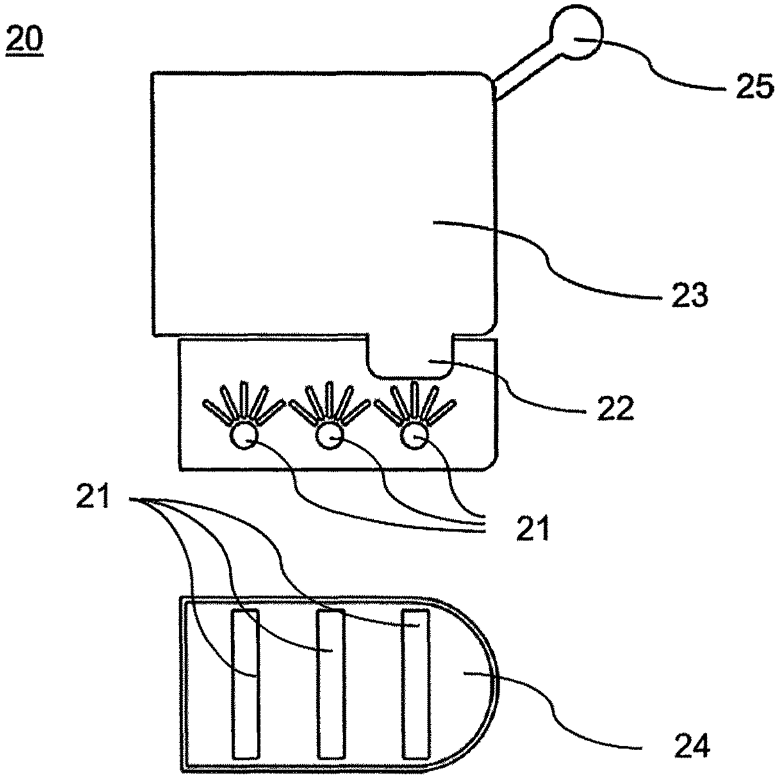
FIG. 4 shows an embodiment of a disinfecting unit.
Figure 5:
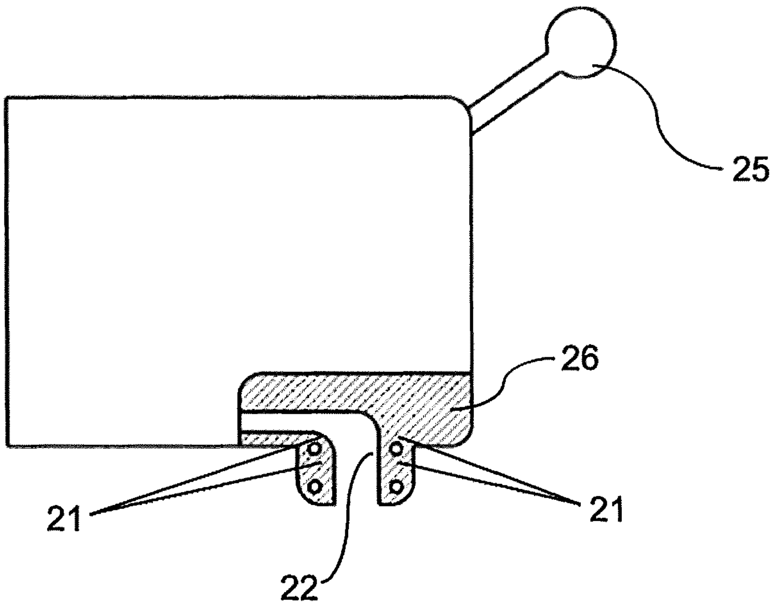
FIG. 5 shows UV light sources embedded in a nozzle holder.
Figure 12:
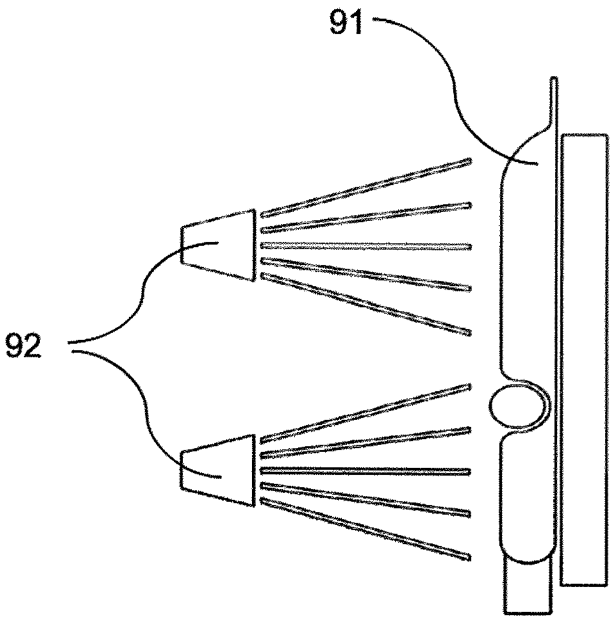
FIG. 12 shows a UV light source radiating a freeze bag.

In order to dispense product, it is necessary for the dispensing nozzle to be exposed to sources of microbial contamination. This could come from the ambient air or someone touching the nozzle or nozzle area. A means for sanitizing, sterilizing and/or otherwise cleaning the dispensing nozzle would be beneficial to limit the chance of contamination. FIG. 4 shows an embodiment of a disinfecting unit 20 that uses electromagnetic radiation (e.g., light) of the proper intensity and wavelength to reduce or eliminate microbial contamination. Germicidal systems utilizing ultraviolet (UV) radiation with wavelengths ranging from 200 nm to 300 nm are known in the art. A UV light source 21 or other appropriate radiation source is positioned to irradiate the nozzle end 22 of the dispensing mechanism. As shown in the figure the light source is attached to a cover 24 that is used when the sanitation process is occurring. Any means known in the art can be used to power the UV light sources 21. The UV sources can also be mounted in a way that does not require a removable cover. In FIG. 5 the UV light sources 21 are embedded in a nozzle holder 26 that is at least partially transparent to UV light. This allows the radiation to reach the surfaces of the dispensing nozzle. While the UV light source 21 is shown acting primarily on the nozzle it could be modified to sanitize other exterior or interior system components. For example, it could be used to sanitize the dispensing handle 25. UV or other sterilizing radiation could also be used to sanitize the freeze bag and mixture in the freeze bag, especially when the mixture is transparent to UV light, for example, saline solution. This would be beneficial for surgical saline slush applications. FIG. 12 shows a UV light sources 92 radiating freeze bag 91.

Figure 6:
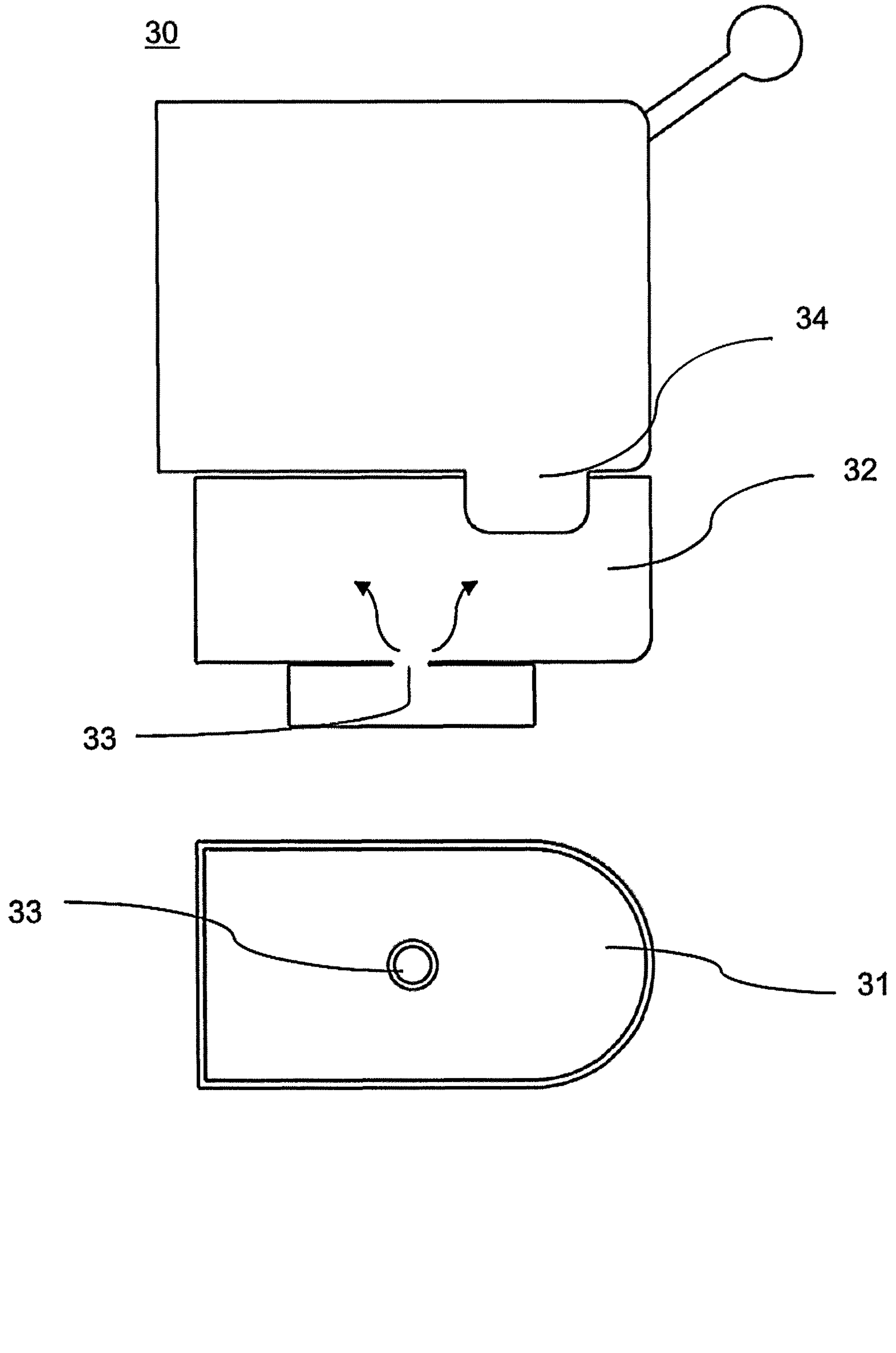
FIG. 6 shows an embodiment where ozone is used to sanitize the nozzle area.

A germicidal system utilizing a gas, vapor, liquid, heat or other means known in the art can also be used to disinfect the nozzle. For example, hydrogen peroxide vapor could be used for sanitizing the nozzle. Ozone also has excellent germicidal properties. A benefit of using ozone to disinfect the nozzle is that ozone can be generated from ambient air using ozone generators, which are known in the art. Only electrical power is needed to produce the required ozone. FIG. 6 shows an embodiment 30 where ozone is used to sanitize the nozzle area 34. An ozone generator 31 is attached to a nozzle cover 32. Ozone produced by the ozone generator flows through port 33 on and around the nozzle area 34.

Figure 7:
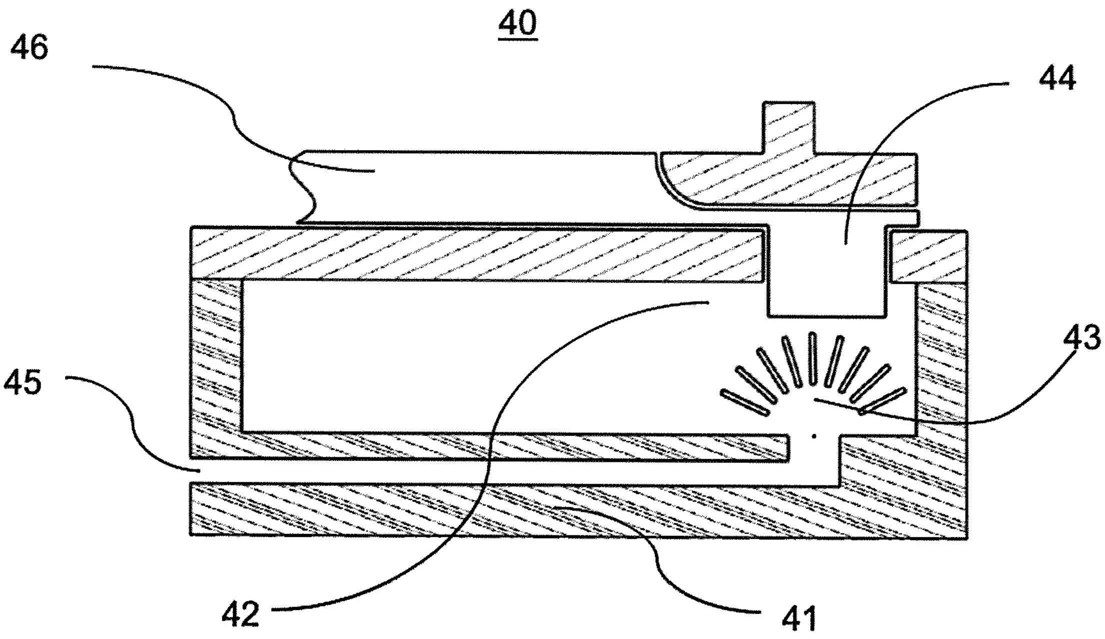
FIG. 7 shows an embodiment of a disinfecting unit 10.

FIG. 7 shows an embodiment of a disinfecting unit 40 that uses a liquid wash to reduce or eliminate microbial contamination in the nozzle area. The liquid can be any suitable liquid or a solution capable of cleaning and or disinfecting the nozzle area. For example, a water based sanitizer solution could be used or just hot water. During the cleaning cycle a hinged cover 41 is closed over the nozzle area 42. A cleaning liquid nozzle 43 is located in the vicinity of the dispensing nozzle 44 so that cleaning liquid is directed toward the dispensing nozzle 44. A fluid passage 45 is in fluid communication with the cleaning liquid nozzle. Depending on the desired operation, some cleaning liquid may be forced some distance into the dispensing tube 46. A means for draining the cleaning liquid (not shown) can be incorporated into the system. The cleaning system can be removable from the frozen confection machine if desired. It can operate manually or automatically. The cleaning liquid can be used alone or in conjunction with other manual or automated cleaning methods.

Figure 8:
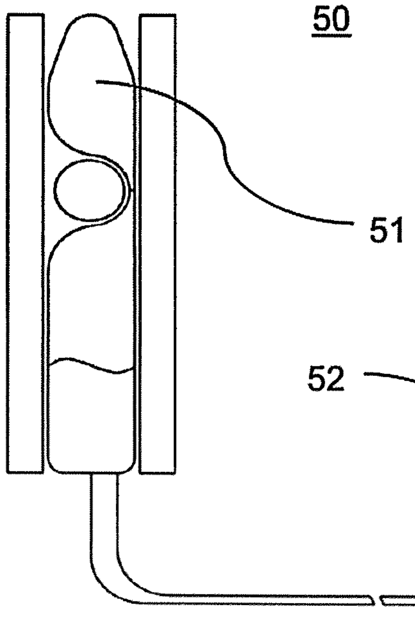
FIG. 8 shows an embodiment of a RPHE.

FIG. 8 shows an embodiment of a RPHE 50 with a freeze bag 51 with an elongated dispensing tube 52. The elongated dispensing tube 52 has particular application to surgical slush machines where it allows sterile saline slush to be conveniently pumped directly where needed for the medical procedure. Currently medical personnel scoop slush from a bowl or other container, bring it to the patient and manually place it where needed.

Figure 9:
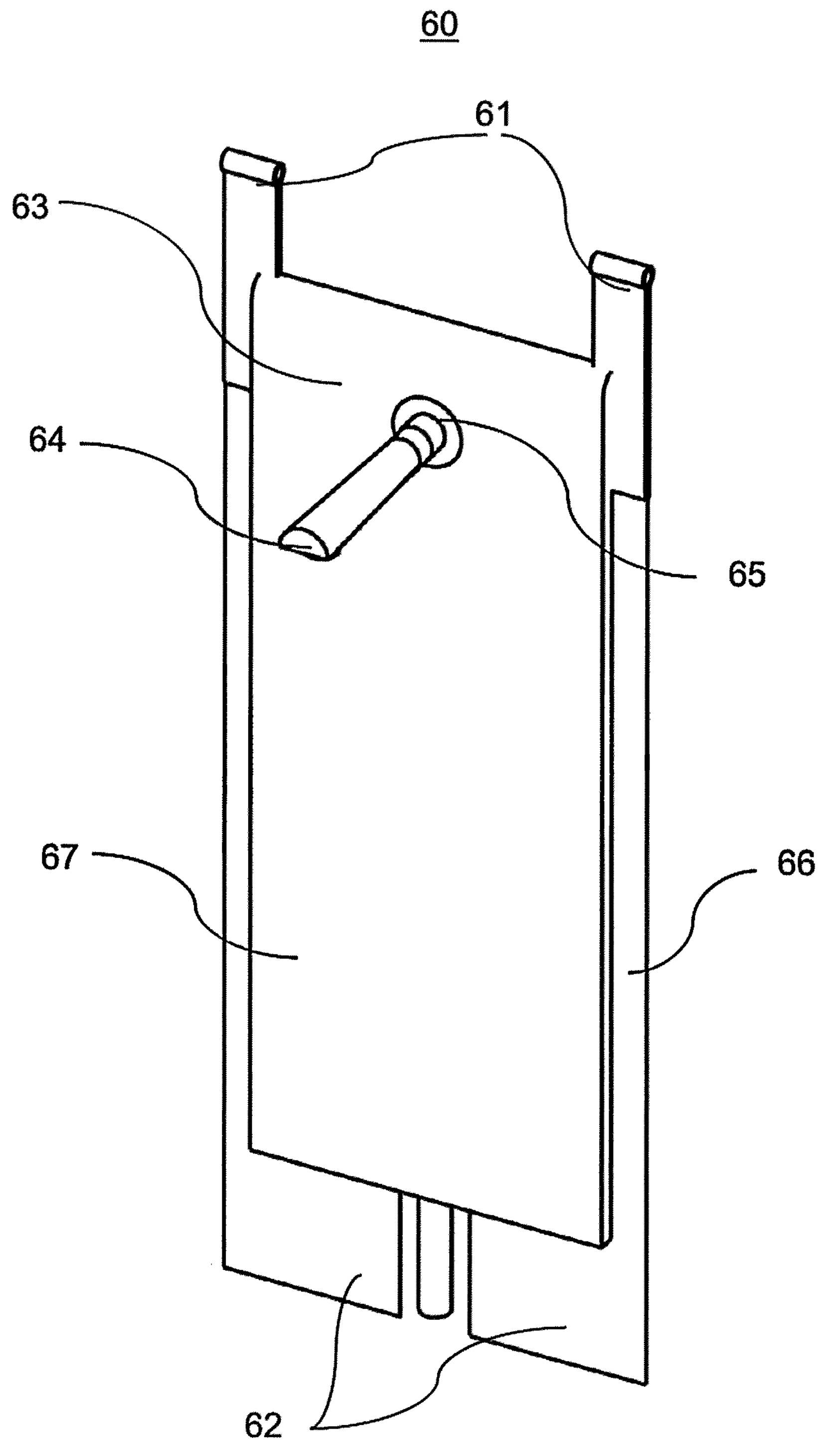
FIG. 9 shows an embodiment of a freeze bag.

FIG. 9 shows an embodiment of a freeze bag 60 or otherwise a flexible package used in a RPHE. The freeze bag 60 has upper support members 61 and lower support members 62 that are attachment points for supporting the freeze bag in the RPHE. The bag body 63 contains the comestible mix. A nozzle 64 typically made of plastic film is attached to the bag body. A transition component 65, such as a plastic fitting, may be used to affix the nozzle to the bag body 63. The nozzle can come in many forms and be constructed from one or multiple pieces, all or some of which may be disposable or reusable. Further, the nozzle could be made with extra length so that it can be trimmed for affecting an ideal fit, opening an initially sealed end or exposing a fresh nozzle end that is less likely to be contaminated from external contaminates. Different parts of the freeze bag 60 may be made from different materials or use different construction techniques to achieve desired performance characteristics. For example, the support members 61, 62, and associated support structure 66 may be constructed from a plastic film or other material with high tensile strength. This permits the freeze bag 60 to withstand the tensile loads induced by the RPHE rollers. The cold plate side 67 of the bag body would ideally be made of a material with high thermal conductivity, while the roller side of the freeze bag (bag side of the bag in FIG. 8 (not visible)) is ideally constructed of a tough material that can withstand the stresses of the rollers acting on the surface of the bag.

Figure 10:
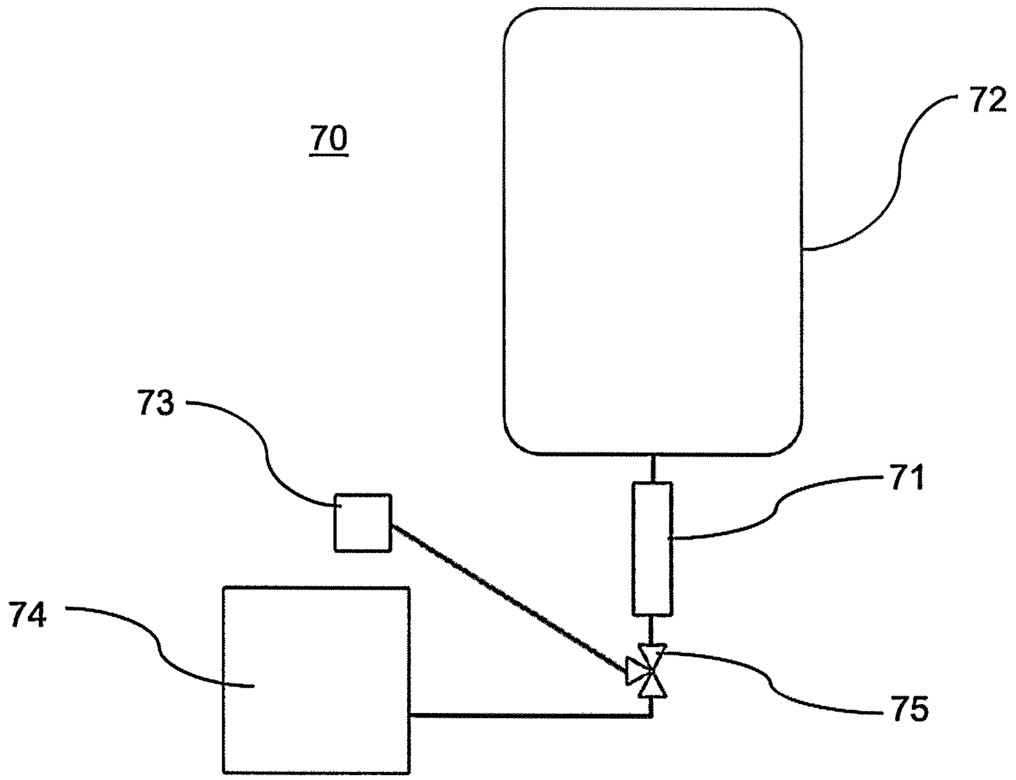
FIG. 10 shows a homogenizer.

FIG. 10 shows an embodiment 70 where a homogenizer 71 is used to pre-homogenize the comestible mix and air so that the requirement for the rollers in the RPHE to produce overrun is reduced or eliminated. An air source (e.g. compressor) 73, is mixed with comestible mix at 3-way fitting 75. At this point the air bubbles are relatively large and, therefore, don't stay well mixed with the liquid comestible mix. The mixture enters the homogenizer 71 where air bubbles aggressively mixed so that their average size is reduced to the point that they do not easily separate from the liquid. For example, the air bubble size may be on the order of 25 microns. The homogenized mix then flows into the freeze bag 72 where freezing occurs. This has the benefit of easing the task of producing overrun that occurs in the RPHE. The homogenizer 71 could be various technologies known in the art. For example, ultrasonic transducers can be used to affect the mixing. A high-speed spinning or oscillating mixing blade could also be used.

Figure 11A:
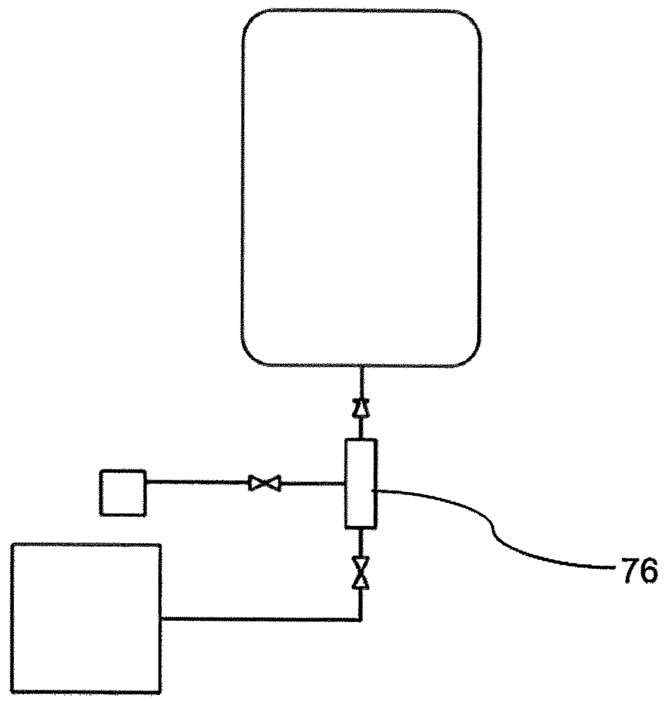
FIG. 11A shows an embodiment that is similar to FIG. 9.
Figure 11B:
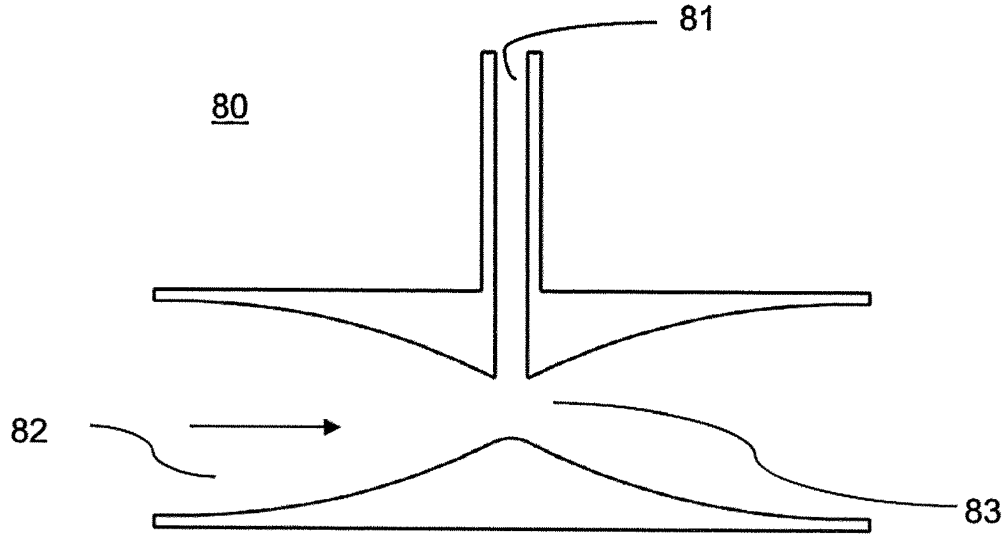
FIG. 11B shows a venturi.

FIG. 11A shows an embodiment that is similar to the FIG. 10 embodiment. In the present case the homogenizer replaces the 3-way valve 75. The homogenizer 76 in this case can be a venturi 80 as shown in FIG. 11B. Liquid mix enters the venturi 80 from an inlet side 82. The flow velocity increases at the throat 83 which lowers the static pressure such that air is drawn in from port 81. The size of the port and the high velocity of the mix at the venturi throat 83 cause the air bubbles to be well mixed with the liquid comestible mix.

Figure 13:
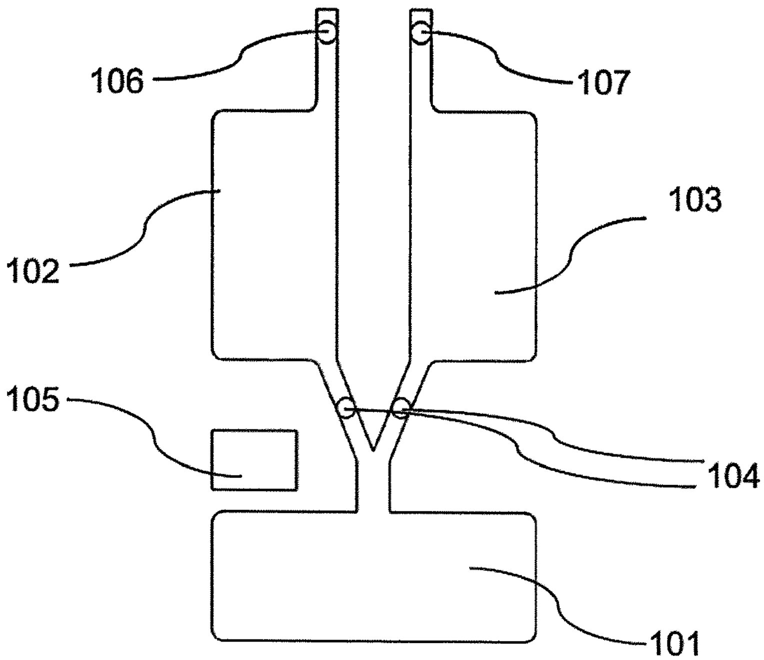
FIG. 13 shows an alternate arrangement for freezing and dispensing a comestible mix.

In FIG. 13 an alternate arrangement for freezing and dispensing a comestible mix is shown that maximizes throughput while eliminating the challenge of keeping frozen and liquid mix separate in the freeze bag. A reservoir bag 101 contains comestible mix that can be fed to a first freeze bag 102 or second freeze bag 103. Valves 104 are used to selectively control the flow of comestible mix into the freeze bags. The freeze bags are in contact with the one or more cold plates that comprise part of a RPHE. During operation comestible mix and air from compressor 105 are fed to a first freeze bag 102. The mix is frozen using the RPHE in any manner that has been previously disclosed. When the mix is properly frozen, it can be dispensed from valve 106 when needed. When desired comestible mix and air can be fed into the second freeze bag 103. This can be done simultaneously with first freeze bag 102 or at another time. The comestible mix in freeze second freeze bag 103 is frozen in a similar manner. Valve 107 is used for dispensing from second freeze bag. Dispensing occurs from first freeze bag first 102. When first freeze bag is partially or fully depleted, dispensing is done from the second freeze bag while the first freeze bag is filled again so that the cycle can repeat. Dispensing can occur from a common nozzle so that the internal process of the machine is not evident externally. Any number of freeze bags can be used. The two shown represents an exemplary case. This embodiment is similar to multi-flavor embodiments disclosed in PCT/US2020/016628. In the present case a single reservoir bag is used to feed product to multiple freeze bags.

Figure 14:
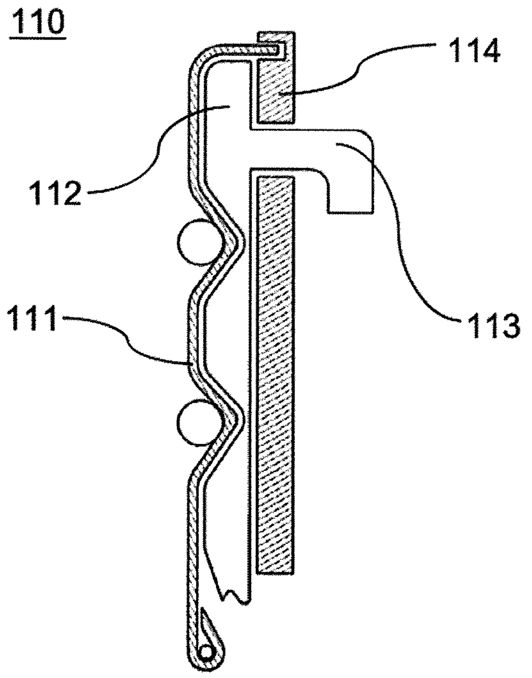
FIG. 14 shows an embodiment that uses a flexible backing member between the freeze bag and rollers.

FIG. 14 shows an embodiment 110 that uses a flexible backing member 111 between the freeze bag and rollers. The flexible backing provides one or more beneficial functions. It can provide overall structural support for the bag so that it holds its shape when filled with comestible mixture. The pressure in the freeze bag 112 is especially high when the comestible mix becomes frozen and viscous. The flexible backing supports the freeze bag so that the stresses are carried by the flexible backing, which prevents rupture of the freeze bag. The flexible backing can reduce or eliminate the support required from the back cold plate (not shown) or similar support piece. Ideally, the flexible member can be made from a durable material like ripstop nylon, or metal mesh. This provides a surface for the roller to contact that is tougher than the plastic film used for the freeze bag. This protects the freeze bag 112 from damage and allows the freeze bag to be made with less expensive materials. This is beneficial since the freeze bag is intended to be disposable. The flexible backing can include a cooling means to assist with the freezing process. This could be cooling channels that are integrated into the flexible backing. The cooling channels are used to circulate a cooling fluid. The flexible backing could be wetted with a fluid with an appropriate freezing point and vapor pressure (e.g., ethyl alcohol) to effect evaporative cooling or to improve thermal contact. The flexible backing could incorporate flexible thermoelectric cooling elements or other means known in the art to affect cooling. For applications where heating is desired any method known in the art can be used for heating the flexible backing, for example, electrical resistance heating can be used. The flexible backing 111 could also be a cover, bag or similar structure. It can fully or partially cover the freeze bag and/or cold plate. It can attach to the cold plate or be supported without attaching to the cold plate. It could also be positioned in a manner similar to the rear cold plate (not shown) so that the rollers are between the flexible backing and the freeze bag. In FIG. 14 the dispensing tube 113 penetrates the cold plate 114. For convenience the cold plate or other structures related to the RPHE can have ports or holes to accommodate dispensing.

Figure 15:
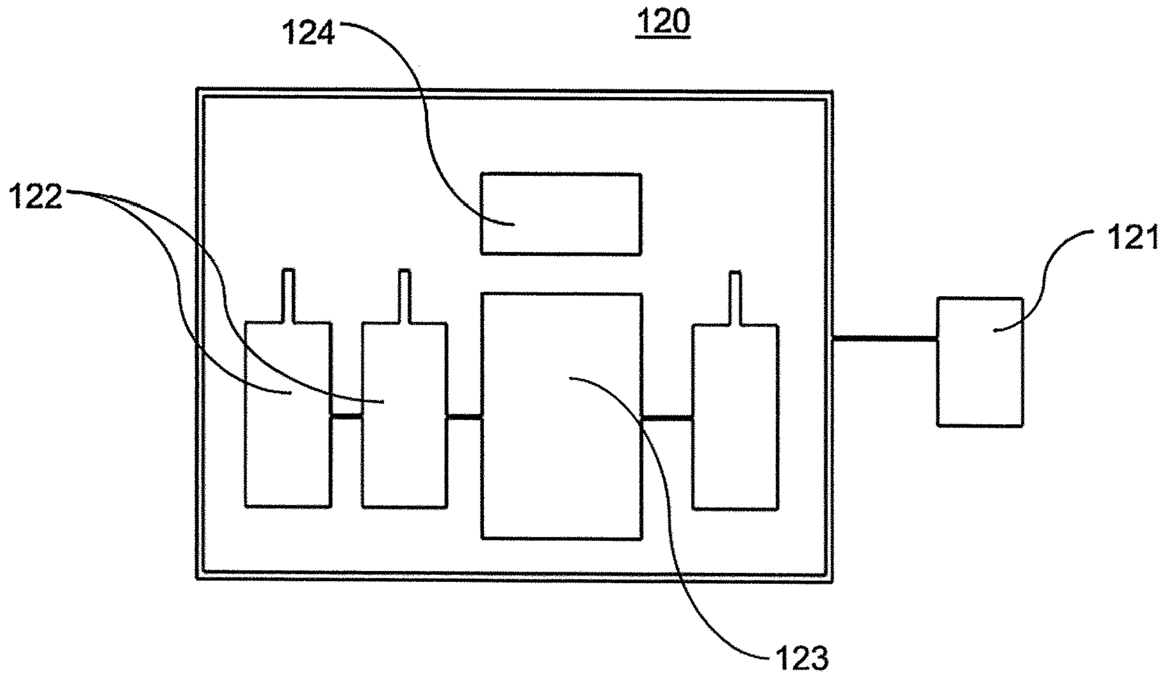
FIG. 15 shows the addition of a point-of-sale system.
Figure 16:
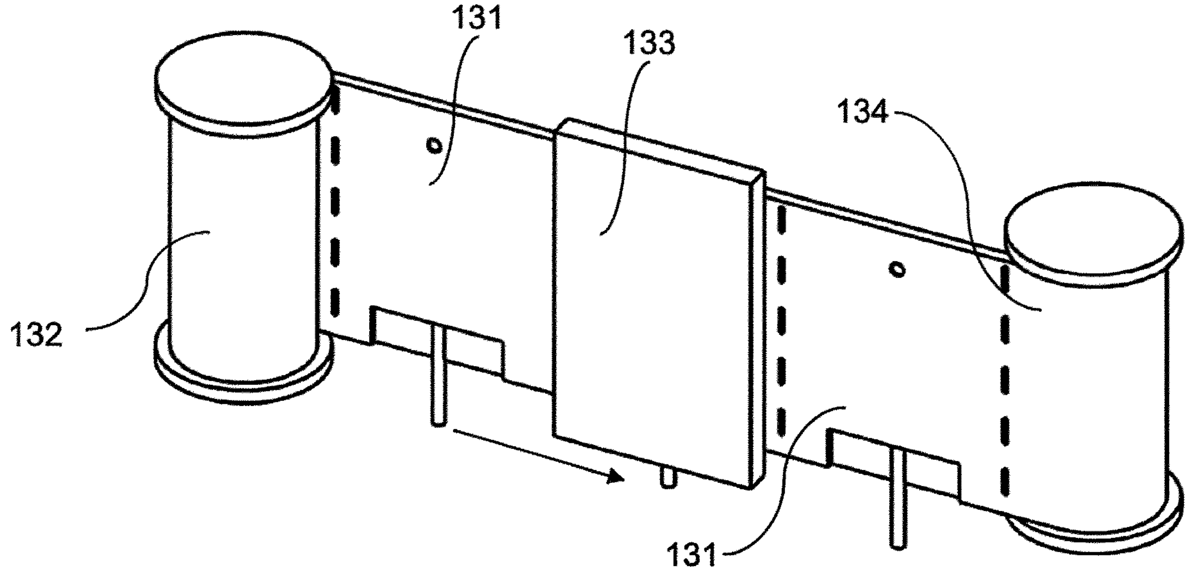
FIG. 16 shows the embodiment of freeze bags on a roll.

With reference to FIG. 15, the frozen confection machine 120 can be adapted for automated vending with the addition of a point-of-sale system 121. This can be any point-of-sale technology known in the art and can be made to accept cash, credit cards, or electronic payments. When used for vending applications it would be beneficial to reduce the time required between replacing the freeze bag and/or reservoir bag. A system is shown where multiple freeze bags 122 are connected to facilitate automatic loading in the RPHE 123. A reservoir 124 is shown that can be automatically connected to each new freeze bag that enters the RPHE. The freeze bags could optionally be prefilled with comestible mix, thus eliminating the need for the reservoir bag. The system could also incorporate multiple reservoir bags as well. FIG. 16 shows an embodiment of freeze bags 131 on a roll. New freeze bags 132 unroll and enter the RPHE 133. Used freeze bags are then taken up by a used freeze bag roll 134.

Figure 17:
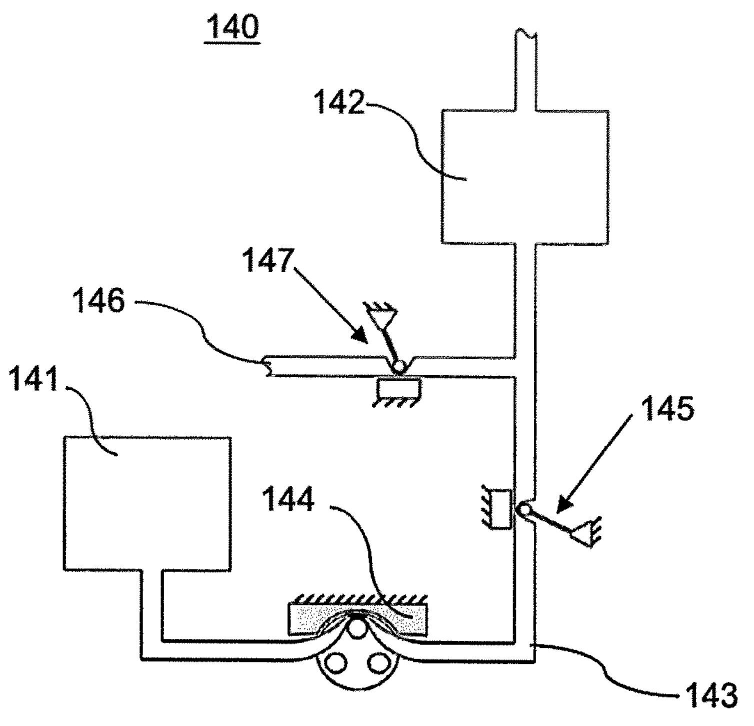
FIG. 17 shows an embodiment of a bag system for the frozen confection machine.
Figure 18A:
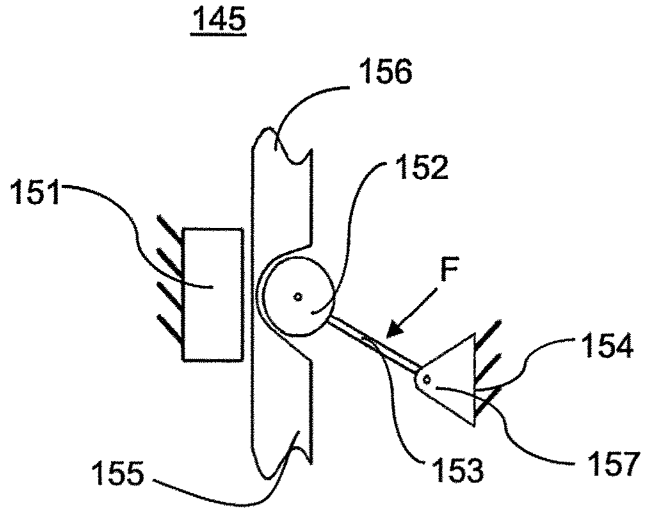
FIGS. 18A-18B show the use of a check valve acting on the external surface of tube.
Figure 18B:
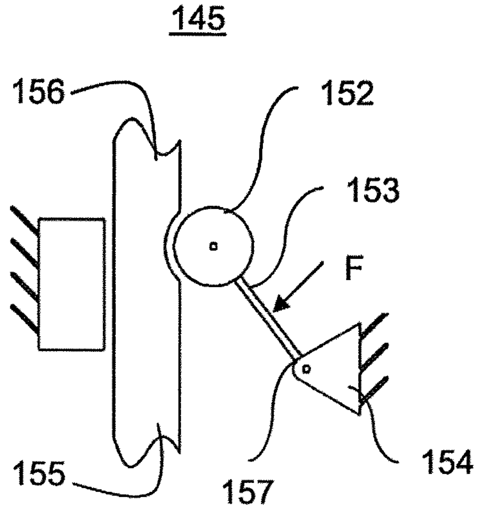

FIG. 17 shows an embodiment of a bag system for the frozen confection machine. The reservoir bag 141 connects to the freeze bag 142 via tube 143. Liquid from the reservoir bag 141 is fed to the freeze bag 142 using pump 144 or other means. An embodiment of an inventive check valve 145 is shown. The check valve prevents liquid from flowing out of the freeze bag 142 back into the reservoir bag 141. This can happen due to gravity when the freeze bag 142 is above the reservoir bag 141 or when the pressure in the freeze bag 142 is higher than the pressure in the reservoir bag 141. The check valve 145 (FIG. 18A-18B) acts on the external surface of tube 143. The tube 143 is preferably made of thin plastic film. This type of tubing lacks significant elasticity and tends to lay flat unless internal pressure inflates the tubing. However, the check valve 145 would still work with elastic or rubber tubing. Check valve 145 includes a base 151 and a movable foot 152. An arm 153 connects the foot to the support 154. The arm 153 is rotatably supported by the support 154 so that the foot 152 can move toward the tube 143 or away from the tube 143. A force is applied on the arm 153 such that the foot 152 is biased toward the tube 143. The force can come from a spring (not shown) or other means known in the art. The tube 143 is pinched between the base 151 and foot 152. This prevents flow of fluid in the tube 143. When the fluid pressure in the upstream tube end 155 is sufficiently greater than the pressure in the downstream tube end 156 the foot 152 pivots away from the base 151 such that flow is permitted in the direction shown. When the downstream tube end 156 and upstream tube end 155 are at similar pressures the tube 143 remains pinched between the base 151 and foot 152. When the downstream tube end 156 pressure exceeds the upstream tube end 155 pressure the foot 152 continues to pinch the tube 143. This is because inflation of the tube 143 from the downstream tube end 156 does not provide the necessary mechanical advantage to overcome the force on the foot. This is controlled by the location of the pivot point 157 with respect to where the foot 152 contacts the tube 143. Mechanical limits on the amount of arm 153 travel as well as the shape of the foot 152 and base 153 can also be used to achieve the desired operation of the check valve. The benefit of the check valve 150 is that it acts on the exterior surface of the tube 143 and, therefore, does not require cleaning and sanitizing. The check valve 145 can also include a means for sensing or detecting the position of the valve. The position of the check valve 145 can be correlated with the pressure in the tube 143 and/or flow rate through the tube. While check valve 145 is depicted on the comestible mix line 143 entering the freeze bag, it can also be used in other locations on the bag system 140. For example, check valve 147 can be the same type of valve. The check valve 150 can be used in conjunction with a peristaltic pump 144 that is optimized for use with lay flat non elastic tubing. However, the basic concept would apply when used with elastic tubing.

Figure 19:
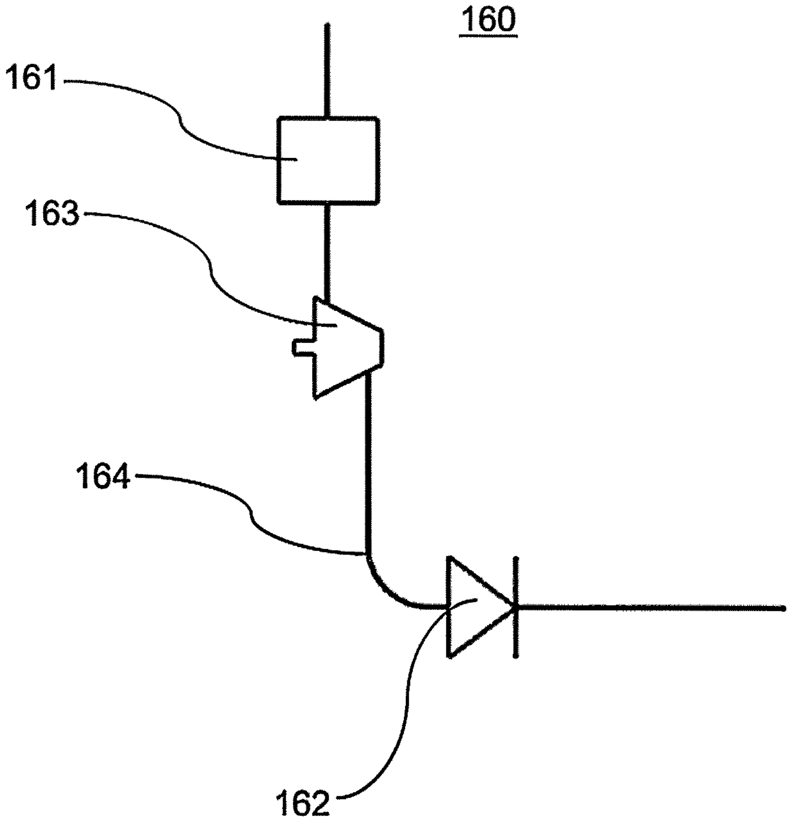
FIG. 19 schematically shows an air purifier.
Figure 20A:
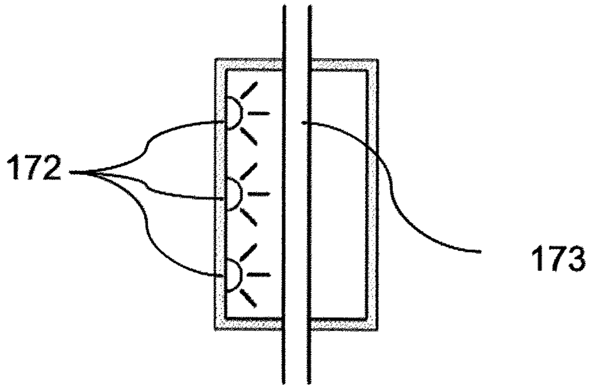
FIGS. 20A, 20B and 20C show an air purifier.
Figure 20B:
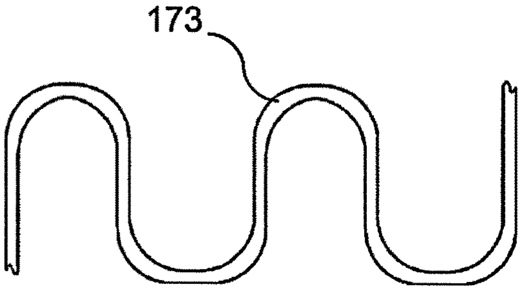
Figure 20C:
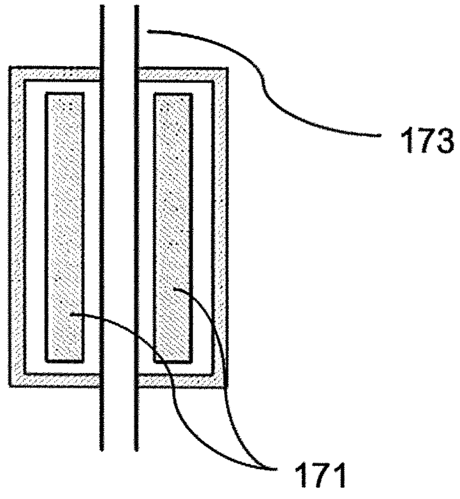

The bag system 160 (FIG. 19) includes an air line 164 that is used in conjunction with a compressor to inject air (or other gas) into the freeze bag to achieve overrun. Air used for overrun is typically atmospheric air and would, therefore, be a potential means of introducing microbial contamination into the comestible mix. An air purifier 161, shown schematically in FIG. 19 can be installed at some point in the air line 164 (e.g., before or after the compressor 163). The air purifier is used to sanitize and or clean the air before it enters the freeze bag. The air purifier can include filtration and/or sanitation. Any means in the art can be used but some methods are preferable. For example, FIGS. 20A and 20B show an air purifier 172 where an ultraviolet light source irradiates a tube 173 with ultraviolet light. The tube, as depicted, makes several U-bends to increase the exposure time of the air to the ultraviolet light. In this case the tube needs to allow at least some transmission of ultraviolet light. The ultraviolet light source 172 can, optionally, be replaced with a heating element 171 that heats the air to a temperature sufficient for sanitizing.

In preferred embodiments a surface of the freeze bag 112 (FIG. 14) contacts the cold plate 114 (FIG. 14) which, in the current embodiment is a generally rigid structure. In this case the freeze bag 112, which is generally described as being flexible, can be rigid or semi-rigid in the area that contacts the cold plate 114. One advantage of this is that all or a portion of the cold plate side of the freeze bag can be made of thin metallic sheet, thick metallic foil or other materials with a high thermal conductivity that may be too rigid or have insufficient fatigue resistance to be on the roller side of the bag.

Figure 21A:
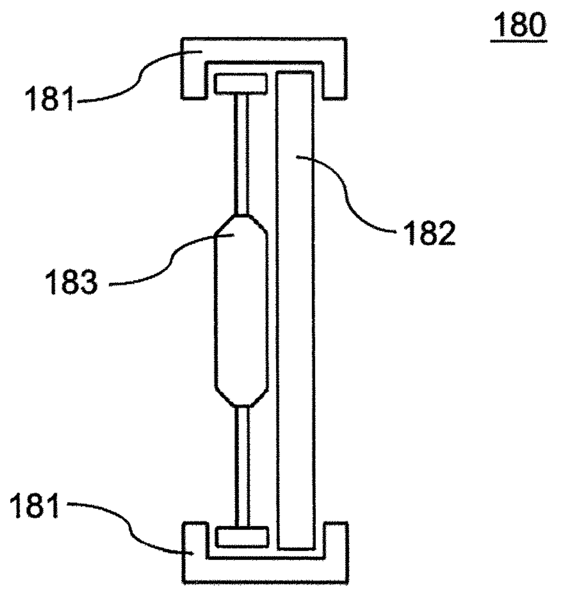
FIG. 21A-21D depict an embodiment where guide rails are affixed to a cold plate.
Figure 21B:
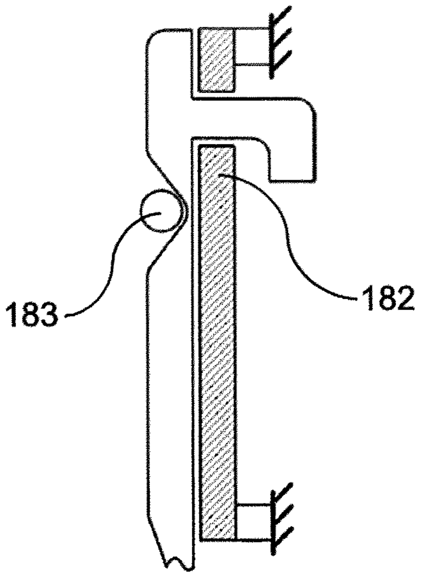
Figure 21C:
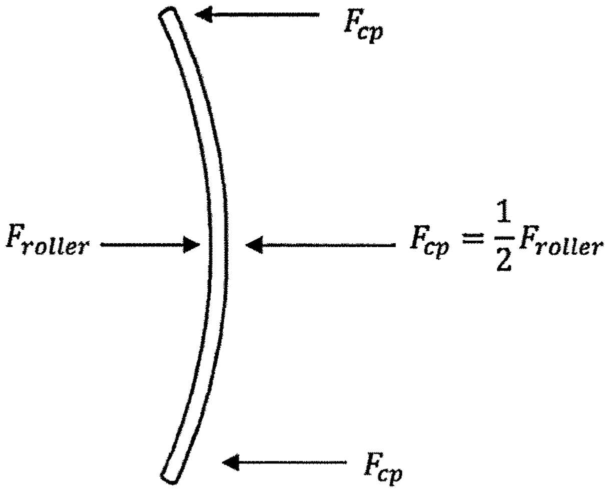
Figure 21D:
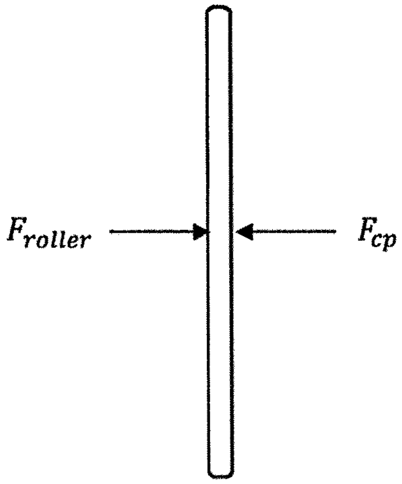

FIGS. 21A-21B depict a top view of an embodiment 180 where the guide rails 181 are affixed to a cold plate 182. The guide rails 181 keep the kneading rollers 183 in close proximity to the cold plate 182 as described in prior disclosures. When the comestible mix (not shown) is frozen a substantial force pushes the kneading roller 183 away from the cold plate. This can cause the cold plate to flex so that the roller is no longer in close proximity to the cold plate. This can negatively impact performance of the system. It can be undesirable to increase the stiffness of the cold plate 182, or other components that provide structural support to the cold plate 182, since this can increase manufacturing cost and add to the thermal mass of the cold plate 183, which is also undesirable. In the current embodiment the force on the guide rail 181 reaction force is directed to the cold plate 182. This eliminates the moment arm between the cold plate 182 attachment point(s) and the force from the roller. FIG. 21C depicts the forces on the cold plate 182 when the guide rails 181 are not attached to the cold plate. FIG. 21D depicts the forces when the guide rails 181 are attached to the cold plate.

Figure 22A:
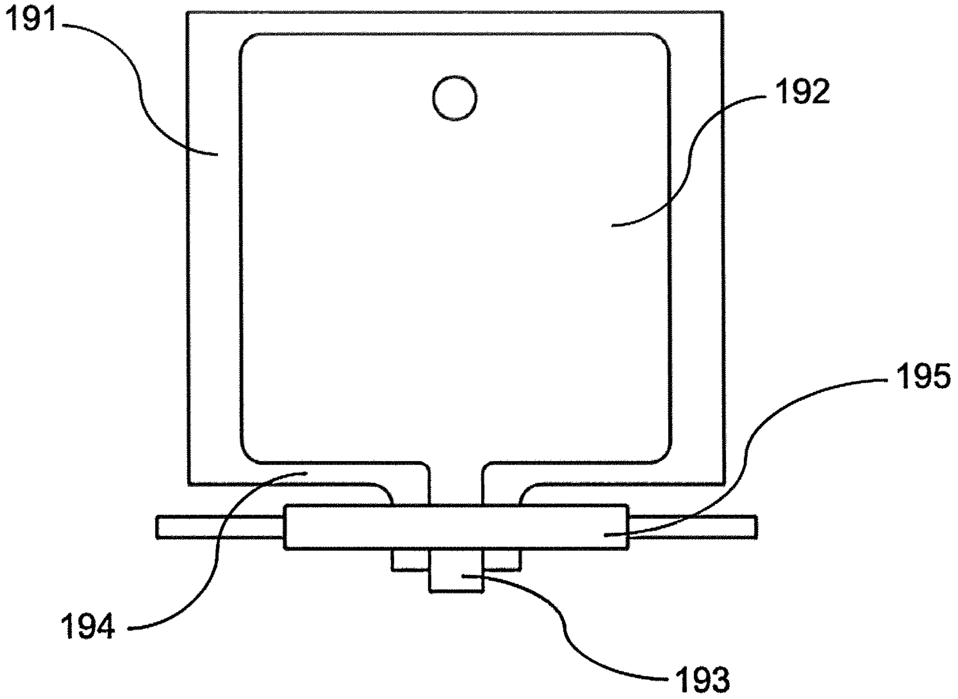
FIGS. 22A and 22B show an embodiment of a cold plate with features that prevent liquid mix from freezing and/or blocking in the inlet tube of the freeze bag.
Figure 22B:
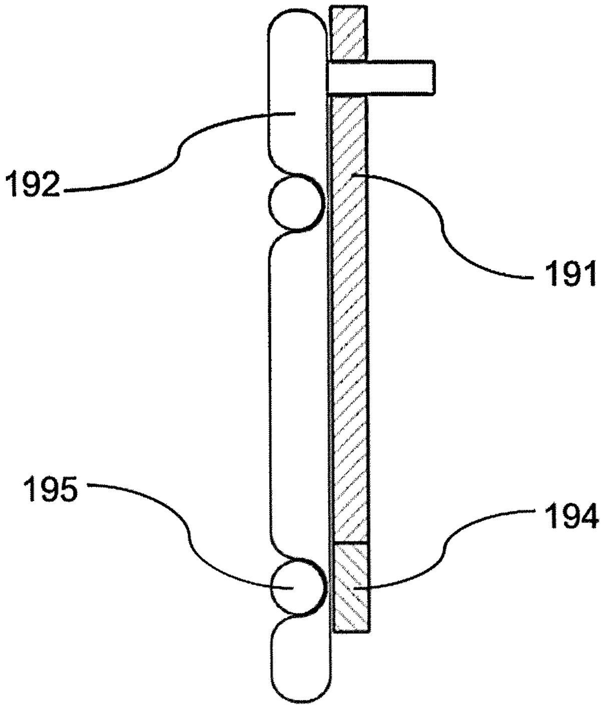

FIGS. 22A-22B depict an embodiment of a cold plate 191 with features that prevent liquid mix from freezing and/or blocking in the inlet tube 193 of the freeze bag 192. This can occur, for example, when liquid mix is not flowing for a period of time. Frozen comestible mix in the inlet tube 193 can plug the tube, preventing the addition of mix into the freeze bag 192 when needed. Cold plate 191 includes an extension 194. Extension 194 can, optionally be not cooled, be made of a thermal insulator and/or have a heating element that acts to limit or prevent the comestible mix in the inlet tube 193 from freezing. When roller 195 traverses inlet tube 193 the inlet tube 193 is pressed between the roller 195 and extension 194. This forces any frozen comestible mix out of the inlet tube 193.

Figure 23A:
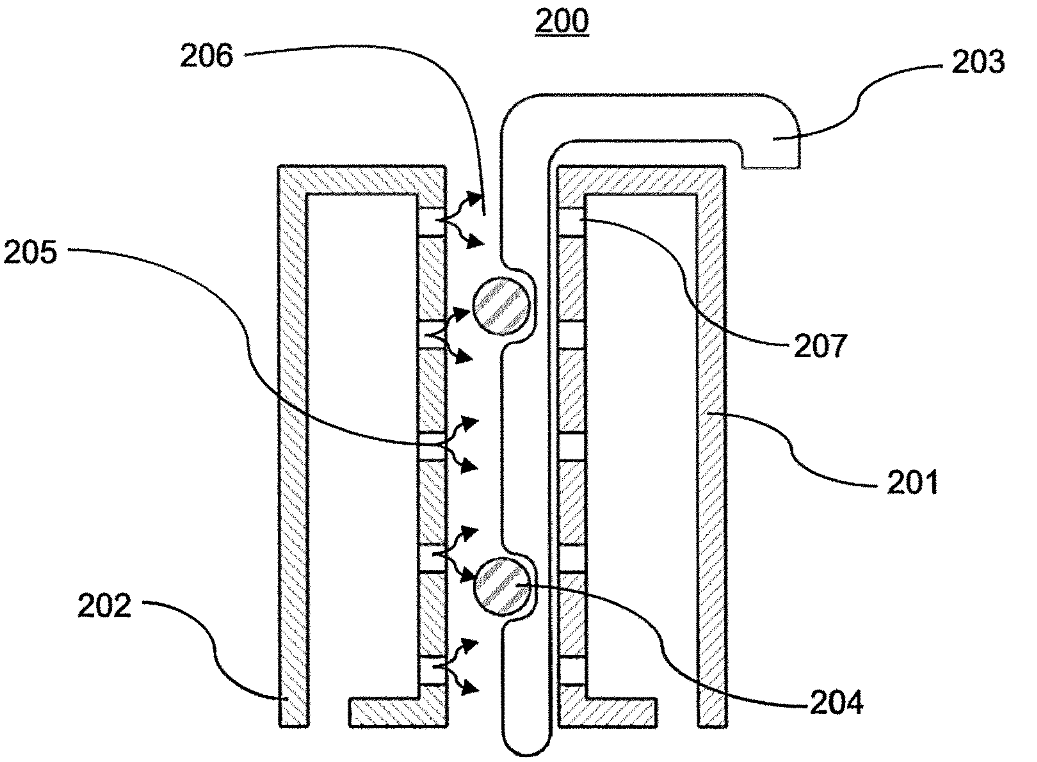
FIGS. 23A and 23B depict a first cold plate and second cold plate with flow channels that are used to enhance system performance.
Figure 23B:
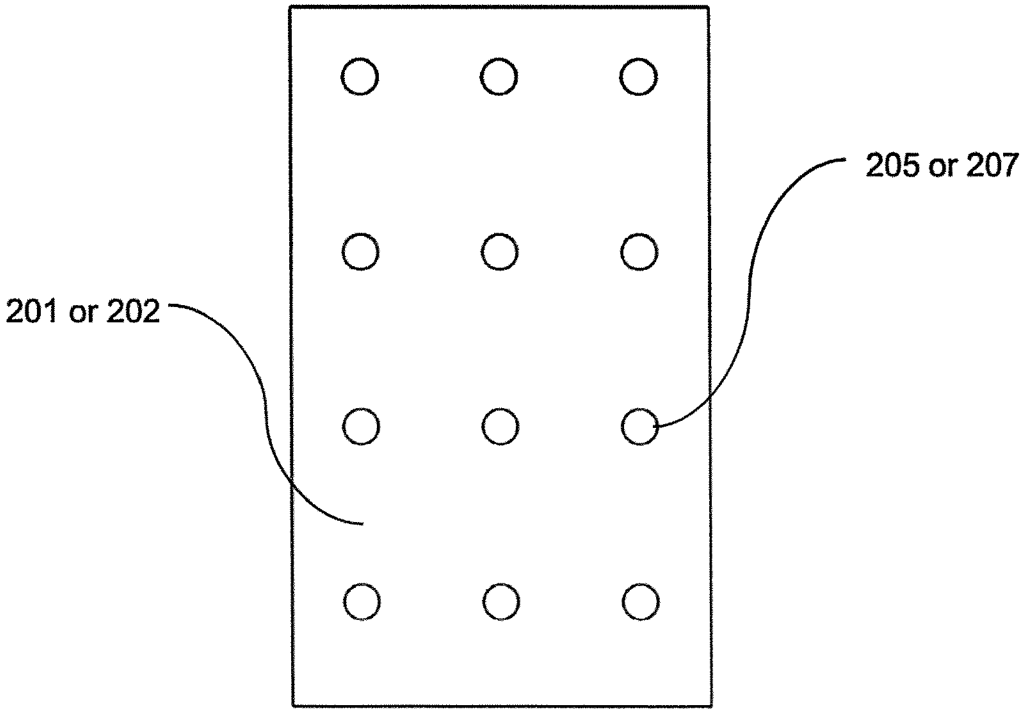

FIGS. 23-23B depict a first cold plate 201 and second cold plate 202 with flow channels that are used to enhance system performance. The second cold plate provides cooling and/or physical support of the freeze bag 203 on the roller side of the freeze bag. The rollers pull the freeze bag 203 away from the surface of the second cold plate 202. This tends to reduce the cooling rate of the comestible mix in the freeze bag 203. To enhance heat transfer the second cold plate 202 has fluid passages 205 for directing jets of cold fluid 206 toward the roller side of the freeze bag 203. Typically, the fluid would be air, but it could also be any number of gasses, liquids or a combination. The second cold plate 202 could provide direct contact cooling to the freeze bag 203 or could not actually contact the second cold plate 202. The second cold plate 202 could provide the cooling for the cold fluid 206 or the fluid could be cooled by other means. The first cold plate 201 can also contain fluid channels 207. These could be used for cooling in a manner similar to the fluid channels on the second cold plate 202. However, the preferred use for these channels is to operate at vacuum pressures. This pulls the freeze bag tightly to the first cold plate 201. This has the effect of reducing thermal contact resistance between the freeze bag 203 and first cold plate 201. This allows for more rapid freezing of the comestible mix in the freeze bag 203. The second benefit is that it helps to hold the freeze bag 203 in place on the first cold plate 201.

Figure 24:
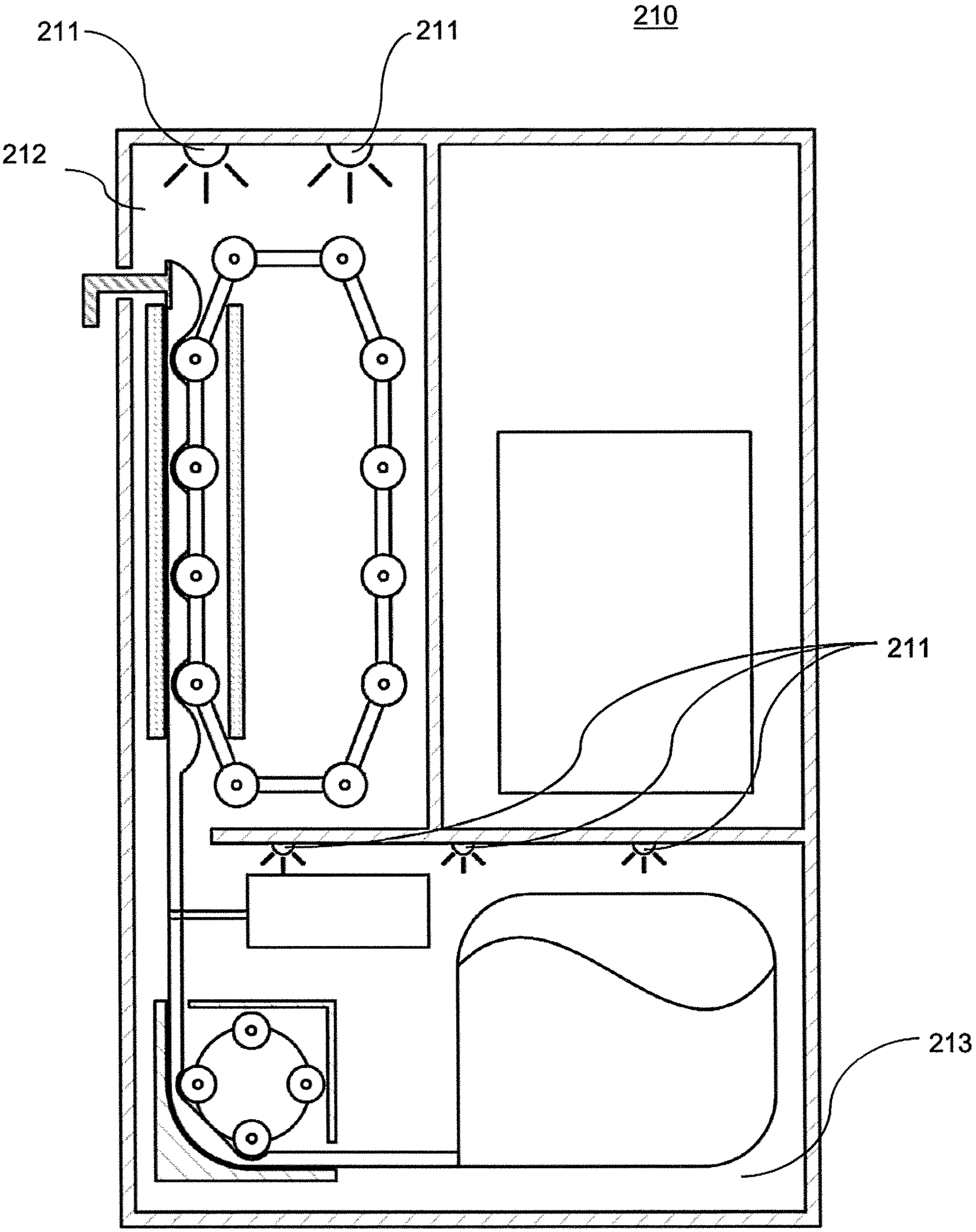
FIG. 24 shows an embodiment of a cleaning system for the frozen confection machine.

FIG. 24 shows an embodiment of a cleaning system for the frozen confection machine. Since the comestible mix is contained in consumable packaging, frequent cleaning of machine components is not required. However, there are instances when cleaning may be needed. For example, if a freeze bag developed a leak or was improperly installed comestible mix could leak into the machine. Frozen confection machine embodiment 210 includes a cleaning system that uses spray nozzles 211 to spray a cleaning solution in the machine. The spray nozzles 211 can be positioned in the freezing section of the machine 212 and/or the refrigerated portion of the machine 213. The cleaning system can use heating elements, ultraviolet light, disinfectants and other cleaning methods known in the art.

Figure 25:
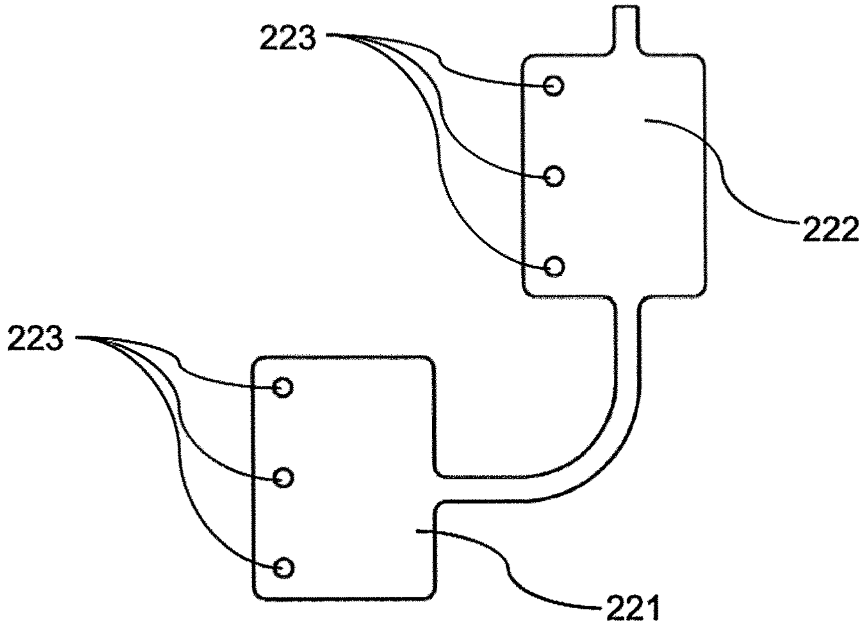
FIG. 25 shows a bag system that incorporates temperature sensing elements.

It is desirable to know the temperature of the comestible mixture at various locations in the system. For example, the temperature of the frozen comestible mix can be used to determine when the mix is ready to dispense. FIG. 25 shows a bag system that incorporates temperature sensing elements 223 on components of the bag system such as the reservoir bag 221 and freeze bag 222. The temperature sensing elements can be integrated or attached to some or all of the bag system components. The temperature sensing can be disposable or reusable. The temperature sensing elements can use one or more temperature sensing methods known in the art. These can include but are not limited to, thermocouples, resistance temperature detectors or thermochromic elements. Thermochromic materials change color in response to temperature. A thermochromic sensor could be attached to a surface of bag system components, or the bag material itself could contain a thermochromic layer or coating. A sensor can be used to detect the color or other characteristic of the material such as hue or transparency (i.e., thermotropism).

In addition to temperature sensing a range of other sensor types or chromogenic materials can be affixed to or incorporated into the bag system. For example, mechanochromic materials change color with compression, stretching or shearing. Mechanochromic materials could be used to sense pressure in the freeze bag 222.

Figure 26:
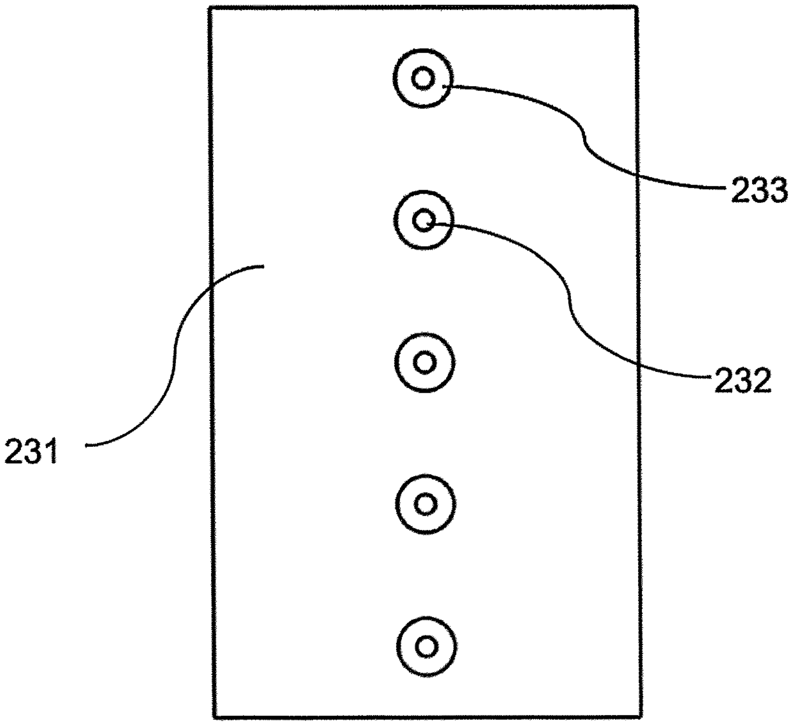
FIG. 26 shows an embodiment of a cold plate with embedded sensors.

FIG. 26 shows an embodiment of a cold plate 231 with embedded sensors. In a preferred embodiment these sensors are temperature sensors. The sensors could be any type known in the art such as but not limited to thermocouples or pyrometers. The temperature sensors 232 are arranged to contact the freeze bag 222 or be in close enough proximity to measure the freeze bag 222 temperature, which is indicative of the temperature of the comestible mix. In the current embodiment the temperature sensor 232 is surrounded by a thermal insulator 233 that is embedded in the cold plate 231. The thermal insulator 233 thermally isolates the temperature sensor 232 from the cold plate 231 so that the temperature of the comestible mix is more accurately measured.

Figure 27:
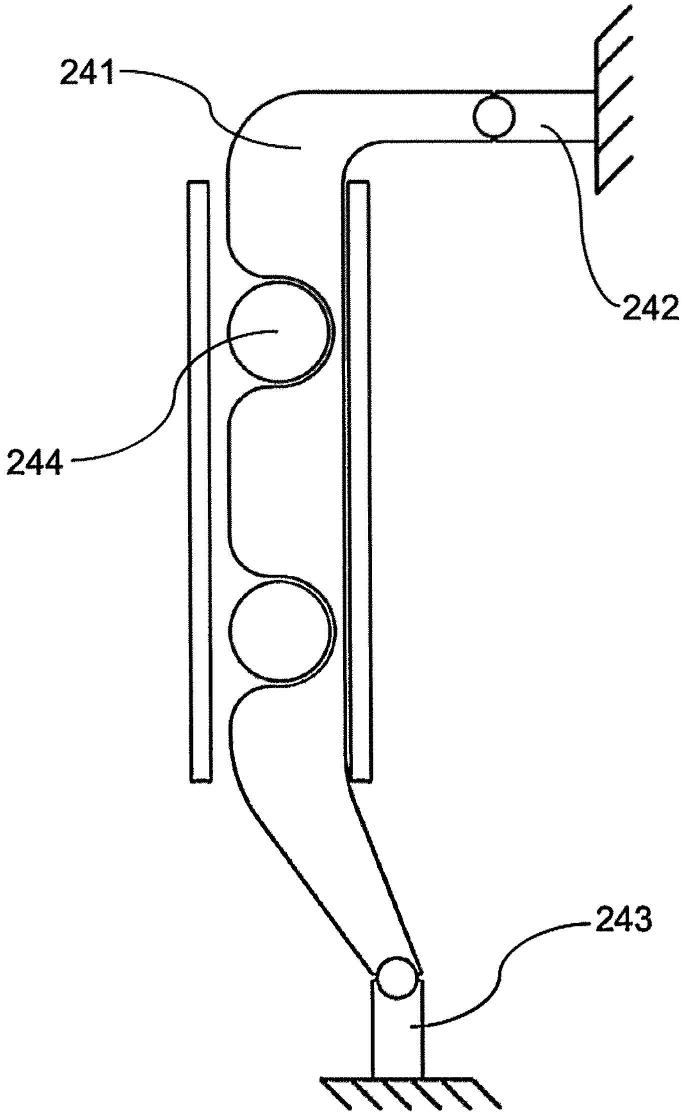
FIG. 27 shows an embodiment where force sensors are used at freeze bag attachment points.

FIG. 27 shows an embodiment where force sensors are used at freeze bag 241 attachment points. In the current embodiment the freeze bag has an upper attachment 242 and a lower attachment 243. Rollers 244 move upward in the figure. This tends to drag the freeze bag 241 upward. The upward pull is dependent on the viscosity of the comestible mix. As the comestible mix freezes and hardens the upward force on the bag increases. A force sensor on lower attachment 243 can be used to determine the relative doneness of the comestible mix. It can also be used as a safety mechanism to stop the rollers if the comestible mix becomes too firm. In the current embodiment the upper attachment 242 is to the right of the freeze bag. Upper attachment 242 can also include a force sensor. In this case, there is a pull to the left as the rollers traverse the freeze bag. This force increases as the comestible mix hardens. Therefore, this force can be used as a means of measuring doneness of the comestible mix.

Figure 28A:
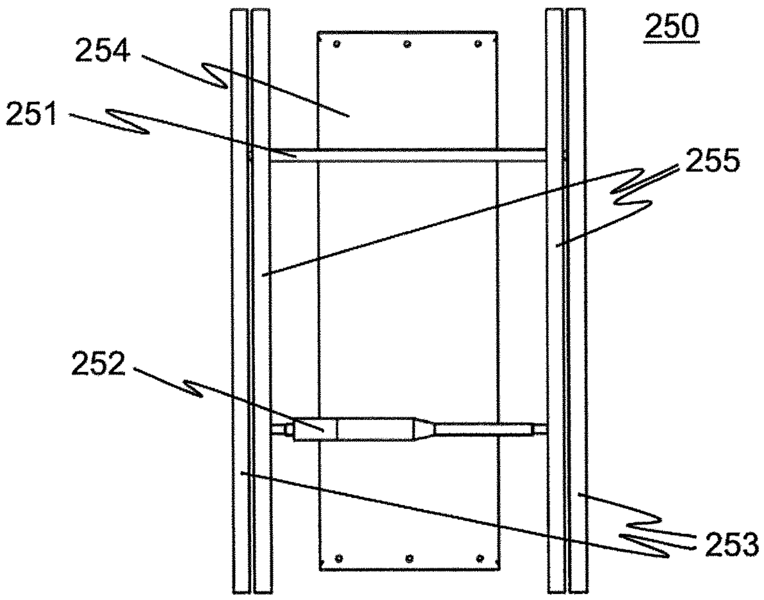
FIGS. 28A-28C show an embodiment of guide rails and rollers.
Figure 28B:
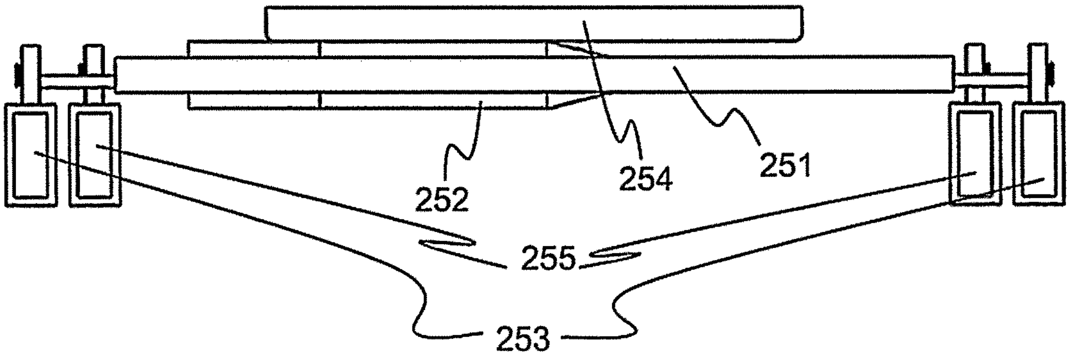
Figure 28C:
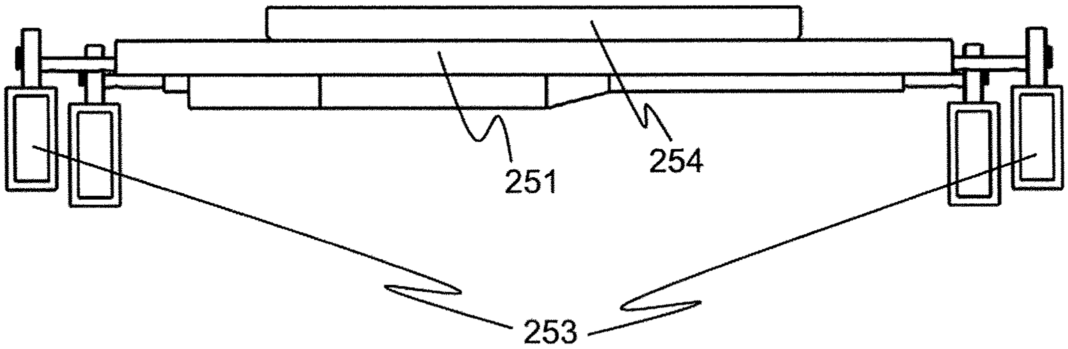
Figure 29A:
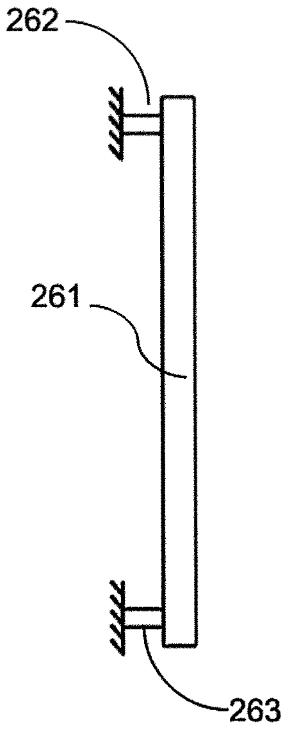
FIG. 29A shows a guide rail with upper and lower supports.
Figure 29B:
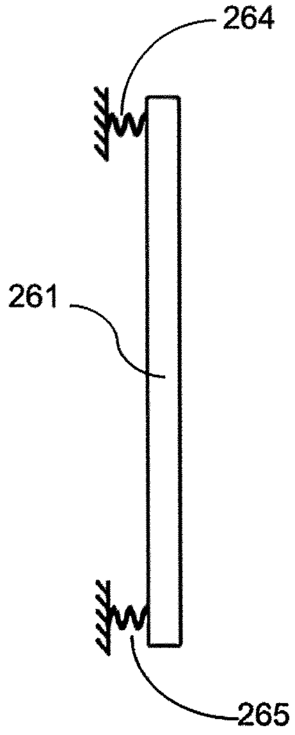
FIG. 29B shows the supports with flexible members.
Figure 29C:
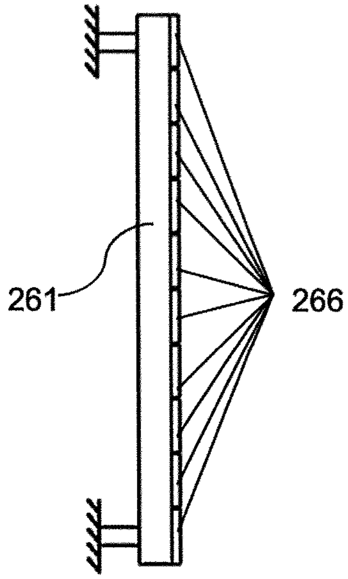
FIG. 29C shows a guide rail with force sensors embedded along the length thereof.

FIGS. 28A-28C show a previously disclosed embodiment of guide rails 253, 255 and rollers 252, 251. The guide rails 255 force roller 252 into the freeze bag for churning the comestible mix. Guide rails 253 force roller 251 into the freeze bag to force dispensing of the comestible mix. The force acting on the guide rails 253, 255 increases as the viscosity of the comestible mix increases. The force can be measured to determine the viscosity of the comestible mix. Any means known in the art can be used to directly or indirectly measure the force, including load cells, strain gauges and displacement transducers. FIG. 29A shows a guide rail 261 with upper support 262 lower support 263. The supports 262, 263 have force sensors embedded in them for measuring the force on the guide rails 261. The force sensors can be any type known in the art such as strain gauge or piezo electric sensors. The force measured at upper support 262 and lower support 263 will differ based on the firmness of the comestible mix and the amount of comestible mix in the freeze bag. Therefore, independent force measurements at the two supports allows for the fullness of the freeze bag and the firmness of the comestible mix to be detected. FIG. 29B shows upper support 264 and lower support 265 with flexible members such as springs. If the force on the guide rails is too high, the flexible members flex, which moves the freeze bag roller away from the freeze bag, which in turn relieves pressure on the freeze bag. This can be used as a safety mechanism to prevent bag rupture. The flexible members 264, 265 can also include force sensors if desired. In addition, the flexible members can be used to bias the rollers into the cold plate so that there is always sufficient contact pressure between the rollers and the freeze bag. FIG. 29C shows a guide rail 261 with force sensors 266 embedded along the length of the guide rail 261. This allows for a more direct measurement of both the firmness of the comestible mix and the fullness of the freeze bag. The force sensors and/or flexible members in FIGS. 29A-29C can also be applied to one or more cold plates to achieve the same benefits as when applied to the guide rails.

Figure 30A:
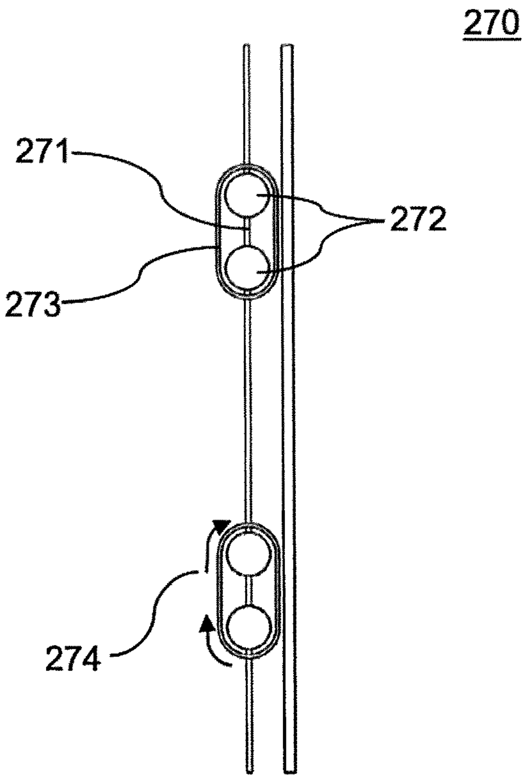
FIGS. 30A and 30B show an embodiment where the kneading roller assembly has rolling supports that support a tread surface.
Figure 30B:
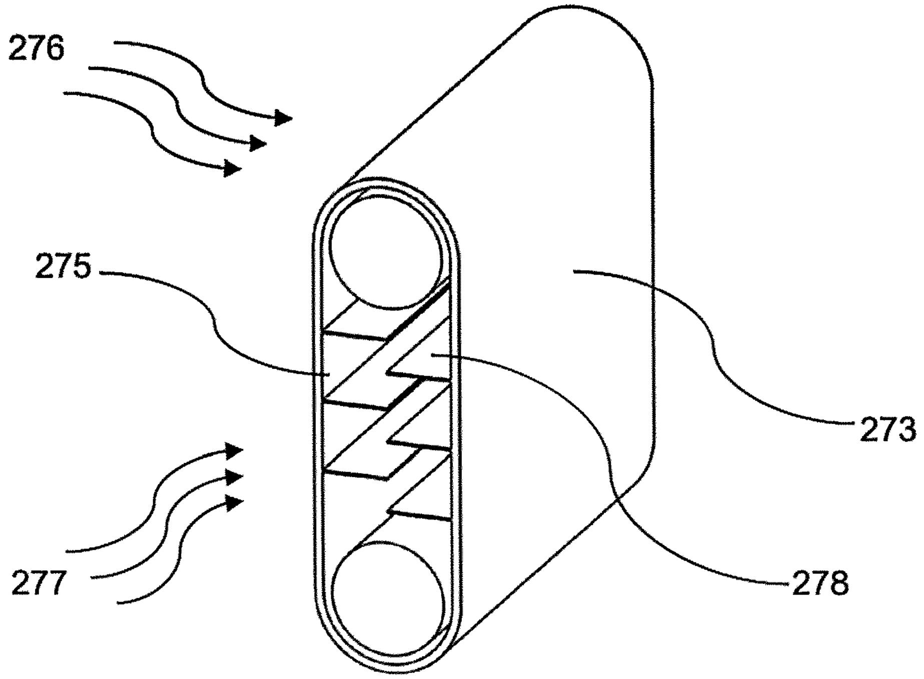

FIGS. 30A-30B show an embodiment 270 where the kneading roller assembly has at least two rolling supports 272 that supports a tread surface 273. The tread surface rolls around the rolling supports 272 as depicted by arrows 274. The arrangement is similar to a tank tread, conveyor belt or tread mill. This arrangement provides several advantages. One advantage is that it reduces rolling resistance and stress on the freeze bag. Another advantage is that the tread surface can be effective for enhancing cooling of the comestible mix. The tread 273 can be made from a thermal conductor. This could be a thin metal or metallic mesh. The tread 273 can be cooled by a cooling medium 276, preferably air on the back side 275 not in contact with the freeze bag. A cooling medium 277 can also be applied to the space between the roller supports as depicted. Cooling fins 278 can be used to enhance heat transfer.

Figure 31A:
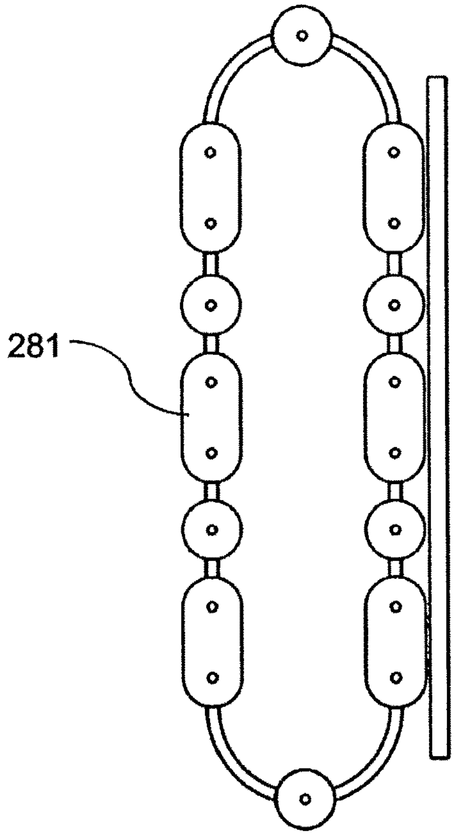
FIGS. 31A and 31B show bag rollers or additional support members on the roller conveyer.
Figure 31B:
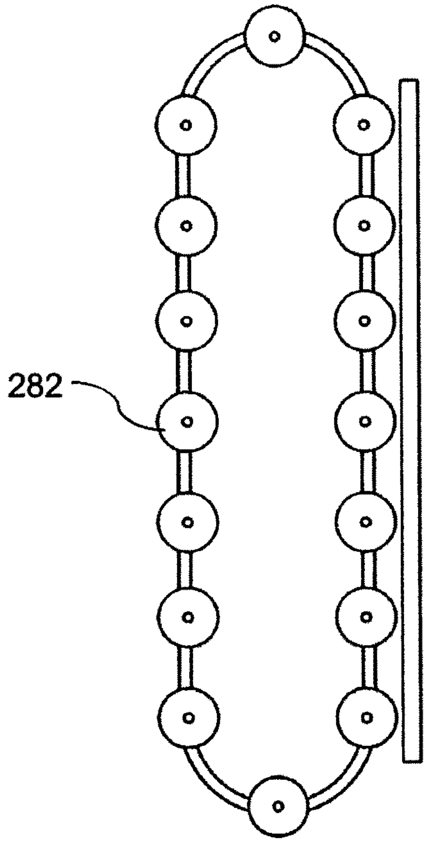

In certain embodiments of the current invention the freeze bag is structurally supported between two cold plates or similar support structures. It can be advantageous to eliminate one of the cold plates or support structures. In this case it is still necessary to support the freeze bag. This can be accomplished by combinations of upper, lower, and/or side supports on the freeze bag that have been previously disclosed. The bag can also be supported by using a sufficient number of rollers 282 or by additional support members 191 on the roller conveyer. This is depicted in FIGS. 31A-31B.

Figure 32A:
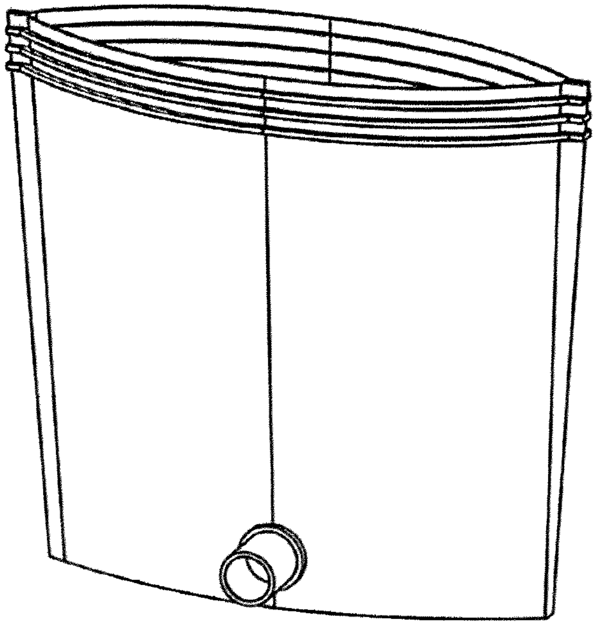
FIGS. 32A-32C depict a reservoir bag with a large opening for filling.
Figure 32B:
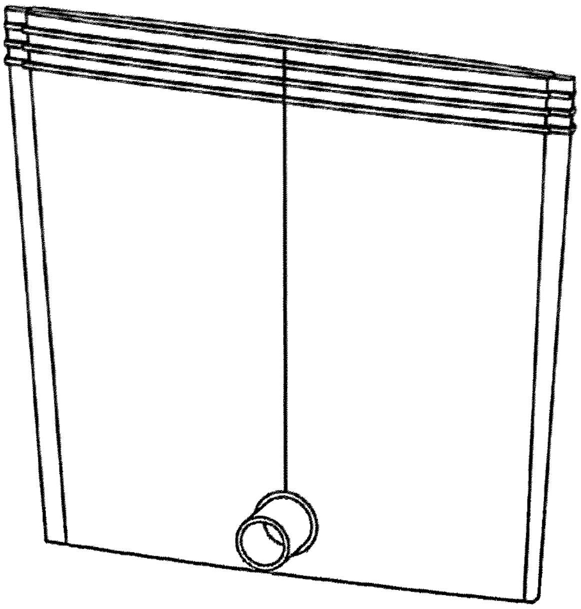
Figure 32C:
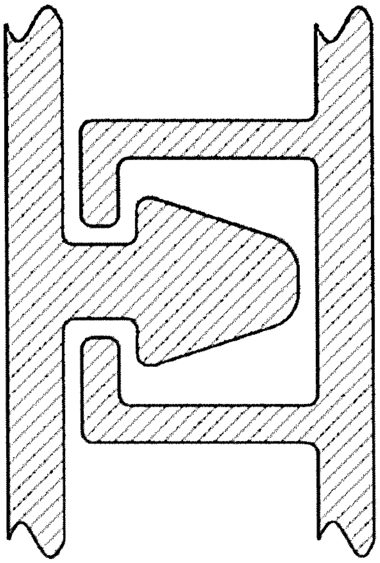

Most conventional soft serve machines currently on the market use a stainless steel hopper to hold the liquid mix. Some machines use a reservoir bag to hold the liquid mix. A standard dairy bag can be purchased for use in these machines. These dairy bags are typically filled with comestible mix by the producer of the comestible mix (e.g., a dairy). Many businesses prefer to use their own custom comestible mixes. It is difficult and tedious to fill a standard dairy bag with comestible mix since it is sealed except for a small port. FIGS. 32A-32C depict a reservoir bag with a large opening for filling. This bag can use a number of means known in the art for closing the bag. For example, press-to-close or slide-to-close zippers can be used. FIG. 32A shows the bag in the open state, FIG. 32B shows the bag with the zipper sealed. FIG. 32C shows a close-up cross section of the push to seal zipper closure.

Figure 33A:
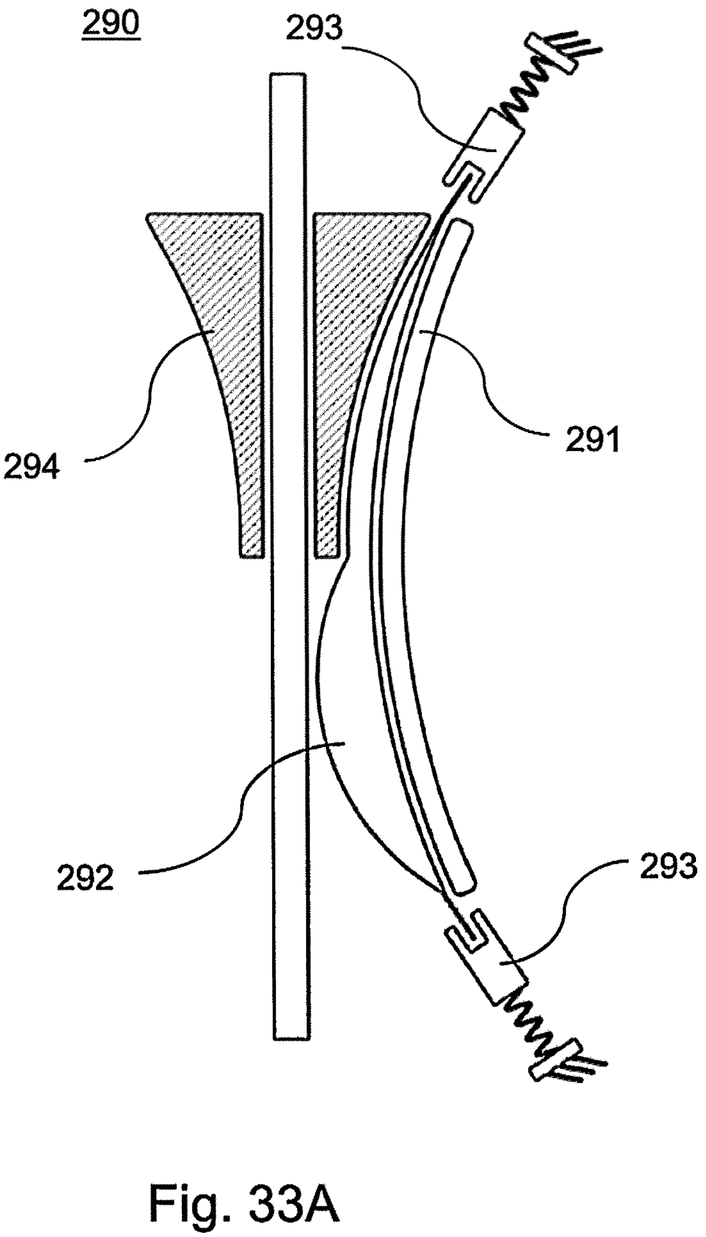
FIGS. 33A and 33B show an embodiment where the cold plate has a curvature when viewed from the top.
Figure 33B:
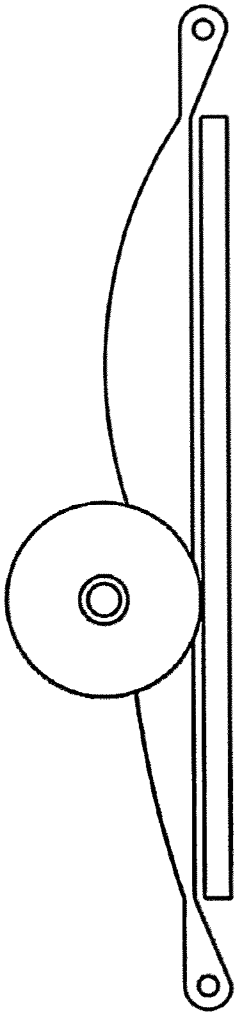

FIGS. 33A-33B show an embodiment where the cold plate 291 has a curvature when viewed from the top. Freeze bag 292 is held by bag retainers 293. The bag retainers 293 hold the freeze bag 292 taut against the cold plate 291. This provides good thermal contact with the cold plate 291. A roller 294 with a concave cross section is used to pinch the freeze bag between the cold plate 291 and roller 294.

Figure 34:
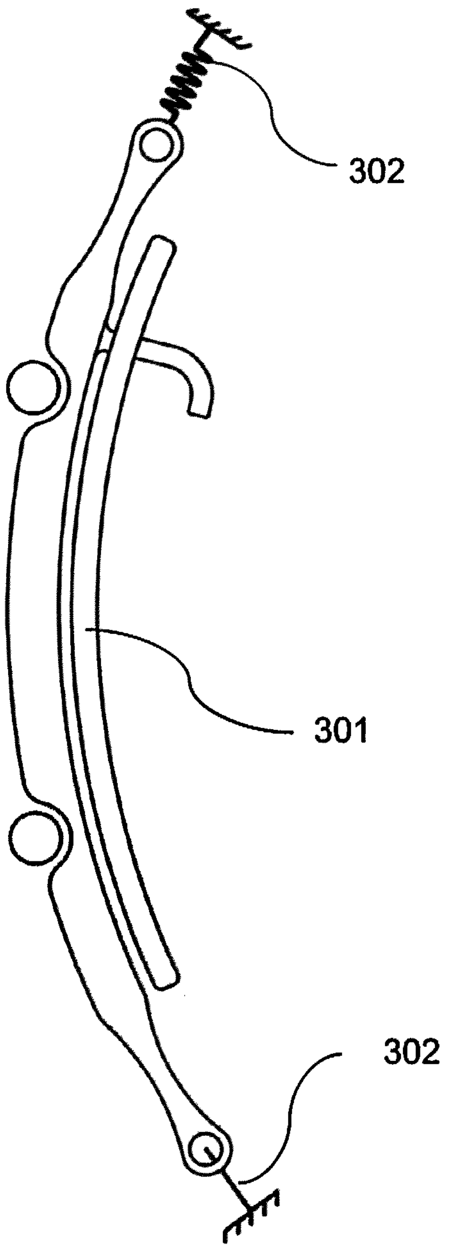
FIG. 34 depicts a cold plate with a convex curve when viewed from the side.

FIG. 34 depicts a cold plate 301 with a convex curve when viewed from the side. Bag retainers 302 hold the bag taut against the cold plate to enhance heat transfer.

The RPHE can be used as a juicer, macerator, or pulverizer where solid components in comestible mix are crushed in the freeze bag, or otherwise broken down by the action of the rollers or other agitation means. This can be done with or without the need for heat transfer to or from the comestible mix. As an example, the RPHE macerating function could be used for making fresh fruit smoothies.

PCT/US2020/016628 discloses using ultrasonic transducers on one or more cold plates or other support structures of the RPHE. It should be made clear that the ultrasonic transducers can be used alone or in conjunction with rollers, heat pipes, thermoelectric cooler or other embodiments of the RPHE.

Figure 35:
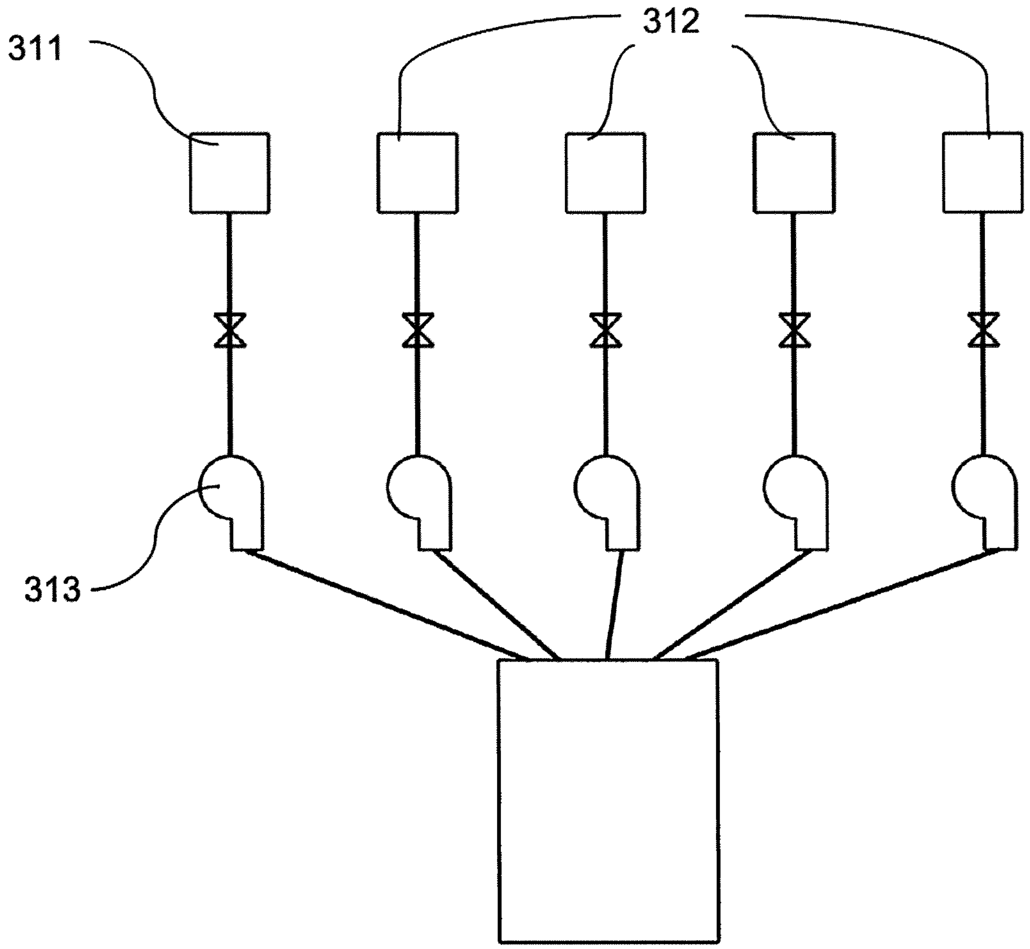
FIG. 35 shows an adaptation of the RPHE for mixing and dispensing liquid or semi-solid paints.

Conventional paint mixing systems inject the tints directly into a container of base paint. In the United States, one gallon or 5 gallon plastic or metal containers are commonly used. One disadvantage of this approach is that it is usually necessary for consumers to purchase more paint than is required for a given project. Once tints have been added to paint they cannot be returned to the seller. The extra paint typically ends up in landfills. Paint may be saved for later use, however, paint does not keep well in containers that have been opened. FIG. 35 shows an adaptation of the RPHE for mixing and dispensing liquid or semi-solid paints, such as architectural paints. The bag holds a base paint 311. This is typically white paint. Paint tints 312 are held in individual paint tint bags. The base paint bag 311 and tint bags 312 are not shown to scale. The base paint and paint tint are dispensed into the mixing bag. Peristaltic pumps 313 can be used, for example. The mixing bag is supported by one or more support plates. The support plates can be temperature controlled. This may provide a benefit, for example if the ambient temperature was relatively low and the paint needs to be warmed. However, temperature control of the support plate is optional for this application. The general structure is similar to the RPHE. Rollers traverse the mixing bag. This mixes the paint tints with the base paint so that the desired paint color is achieved. The number of available paint tints can vary as to achieve the range of color options desired. Approximately 12 to 16 tint colors would be typical. Since the base paint and tint are added to the mixing bag, the precise amount of paint needed for a given project can mixed. The remaining paint in the reservoir bag is not contaminated with the paint tints. If colored paint is used up, an additional appropriate quantity can be mixed. The mixing bag is a consumable item. Ideally, the reservoir bag is sealed and does not contain air, therefore, the shelf-life of the paint is substantially increased. The system can be made portable and brought to the job site. The mixing bag can be made to dispense into another container, or the paint could be sold in the mixing bag.

Although specific advantages have been enumerated above, various embodiments may include some, none, or all of the enumerated advantages. Although exemplary embodiments are illustrated in the figures and description herein, the principles of the present disclosure may be implemented using any number of techniques, whether currently known or not. Moreover, the operations of the systems and apparatuses disclosed herein may be performed by more, fewer, or other components, and the methods described herein may include more, fewer, or other steps. Additionally, steps may be performed in any suitable order.

To aid the Patent Office and any readers of this application and any resulting patent in interpreting the claims appended hereto, applicants do not intend any of the appended claims or claim elements to invoke 35 USC 112 (f) unless the words "means for" or "step for" are explicitly used in the particular claim, and even though the term "means" has been used in the above description.

What is claimed is:

1. A frozen fluid mixing and dispensing apparatus comprising;

a flexible-walled package enclosing a cavity for receiving an associated liquid, the package including at least one inlet configured to receive the associated liquid and at least one outlet communicating with the cavity and configured to dispense an associated frozen slurry therethrough;

an assembly for mixing the associated liquid that includes a heat exchanger including at least one cold plate operatively engaging an external surface of the flexible-walled package for heat transfer with the associated liquid in the package cavity and a fluid movement structure for moving the associated liquid in the flexible-walled package;

further comprising a thermally insulated, sealed container dimensioned to receive the flexible-walled package and the heat exchanger therein that limits frosting that can occur; and a frost collector in the sealed container wherein the frost collector is cooled to collect moisture.

2. The apparatus of claim 1 further comprising the frost collector cooling the collected moisture to a temperature less than the cold plate and thereby prevent condensation of frosting of the cold plate.

3. The apparatus of claim 2 wherein the frost collector includes at least one of (i) a hydrophilic coating to hold the collected moisture; (ii) a water absorbing material for absorbing the moisture; (iii) dessicant, or (iv) a dehumidifier to remove moisture from air introduced into the container.

4. The apparatus of claim 1 wherein the cold plate is a metallic sheet or metallic foil.

5. The apparatus of claim 1 wherein the cold plate includes an extension that includes a heating element for selectively heating the at least one inlet to the cavity to prevent the associated liquid in the inlet from freezing.

6. The apparatus of claim 1, wherein the frost collector is cooled before the cold plate.

7. The apparatus of claim 1, wherein the frost collector is separate from the heat exchanger.

* * * * *